Inventors:
Robert J. Jauch,
Byron J. Pepper,
By Atkinson, Huxley, Bryon & Knight
Attys July 26, 1938.   R. J. JAUCH ET AL   2,124,681
LIQUID DISPENSING APPARATUS
Filed June 15, 1936   16 Sheets-Sheet 5

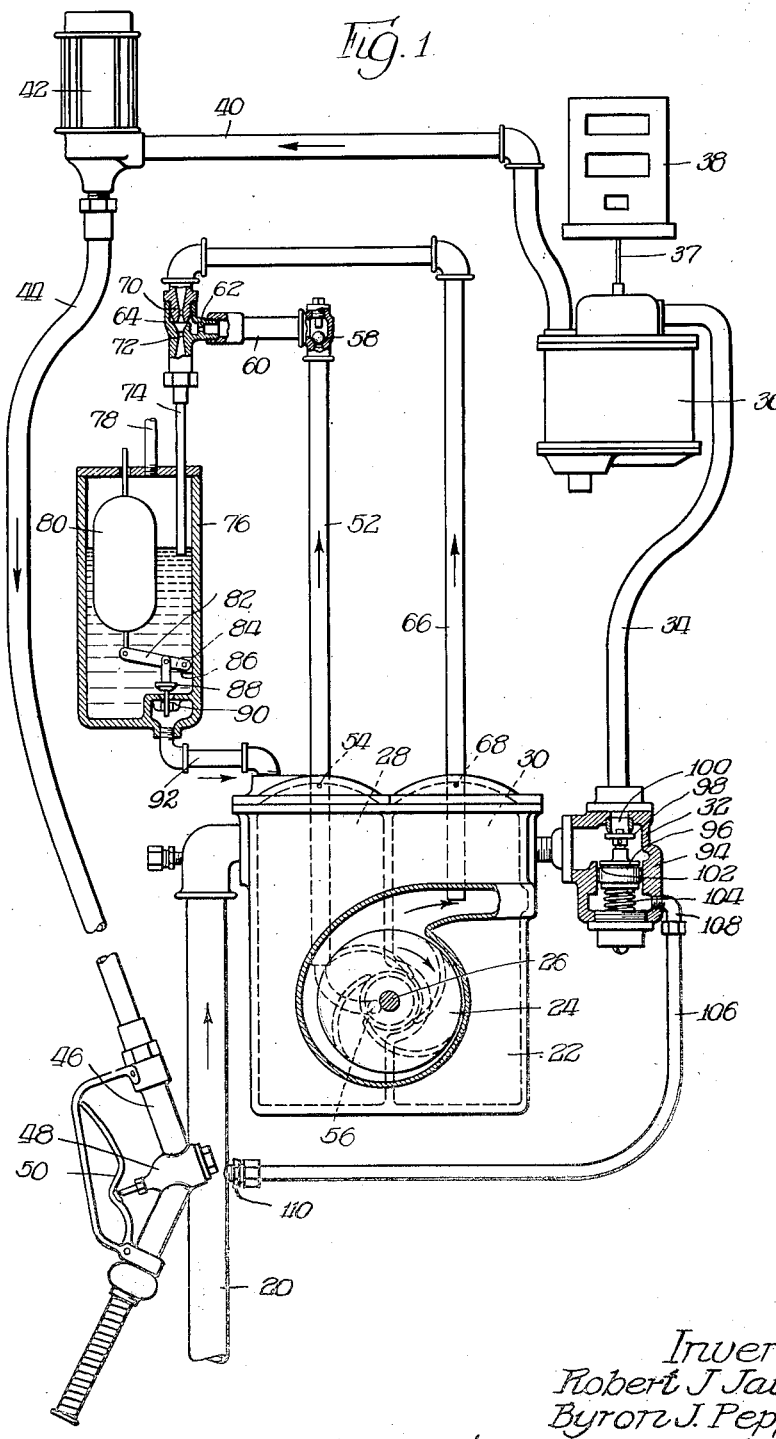

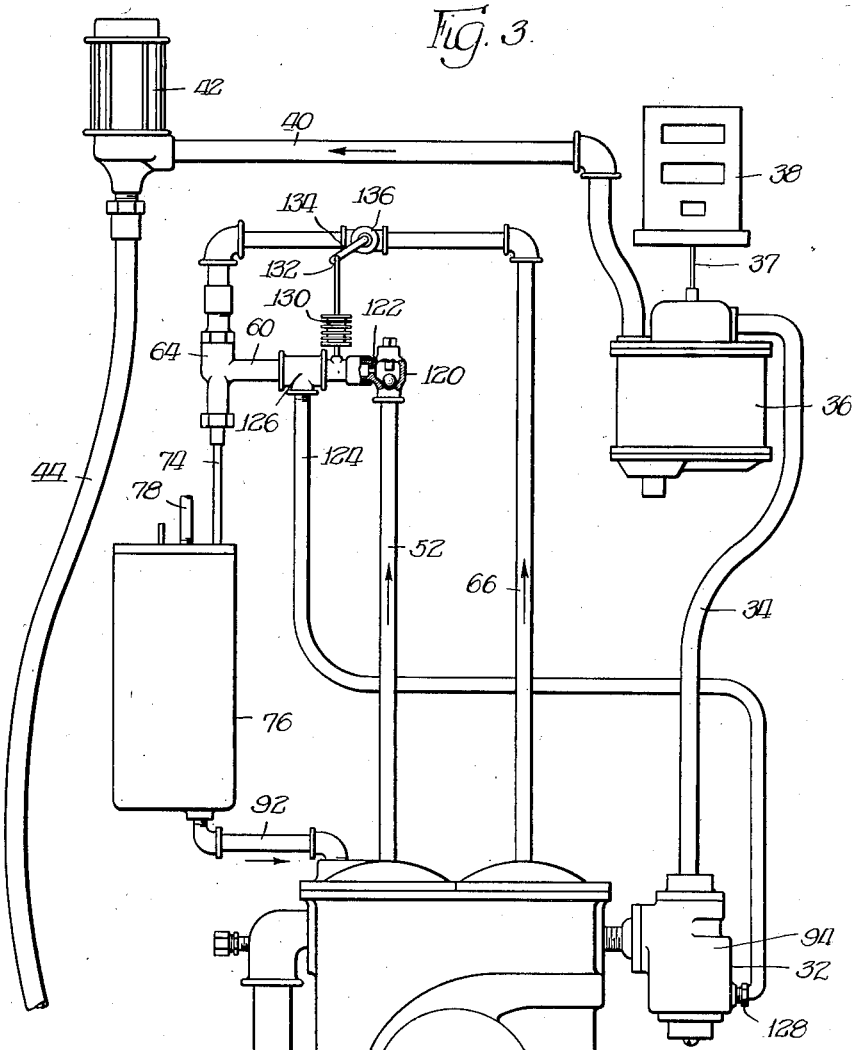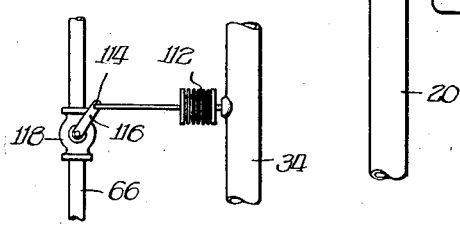

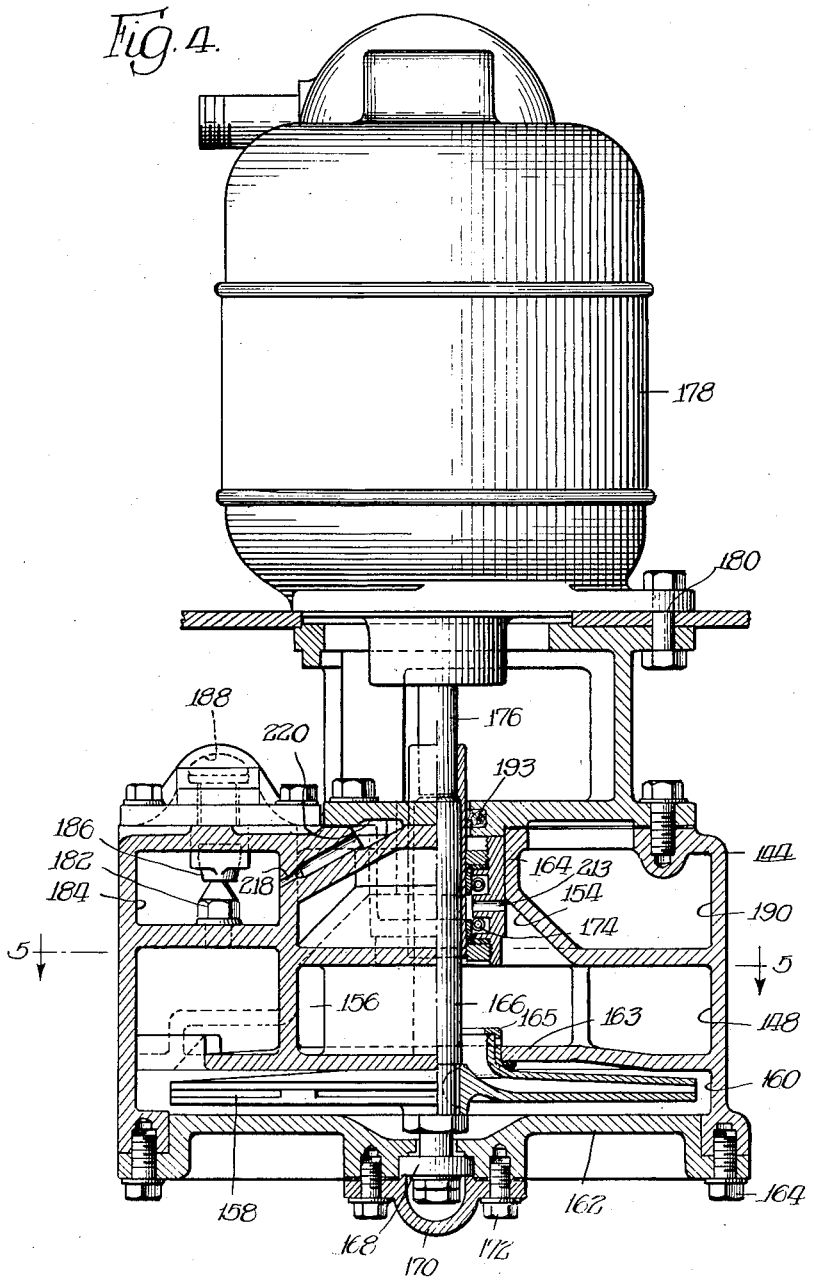

Inventors:
Robert J. Jauch,
Byron J. Pepper,
By Dickinson, Huxley, Byron & Knight
attys

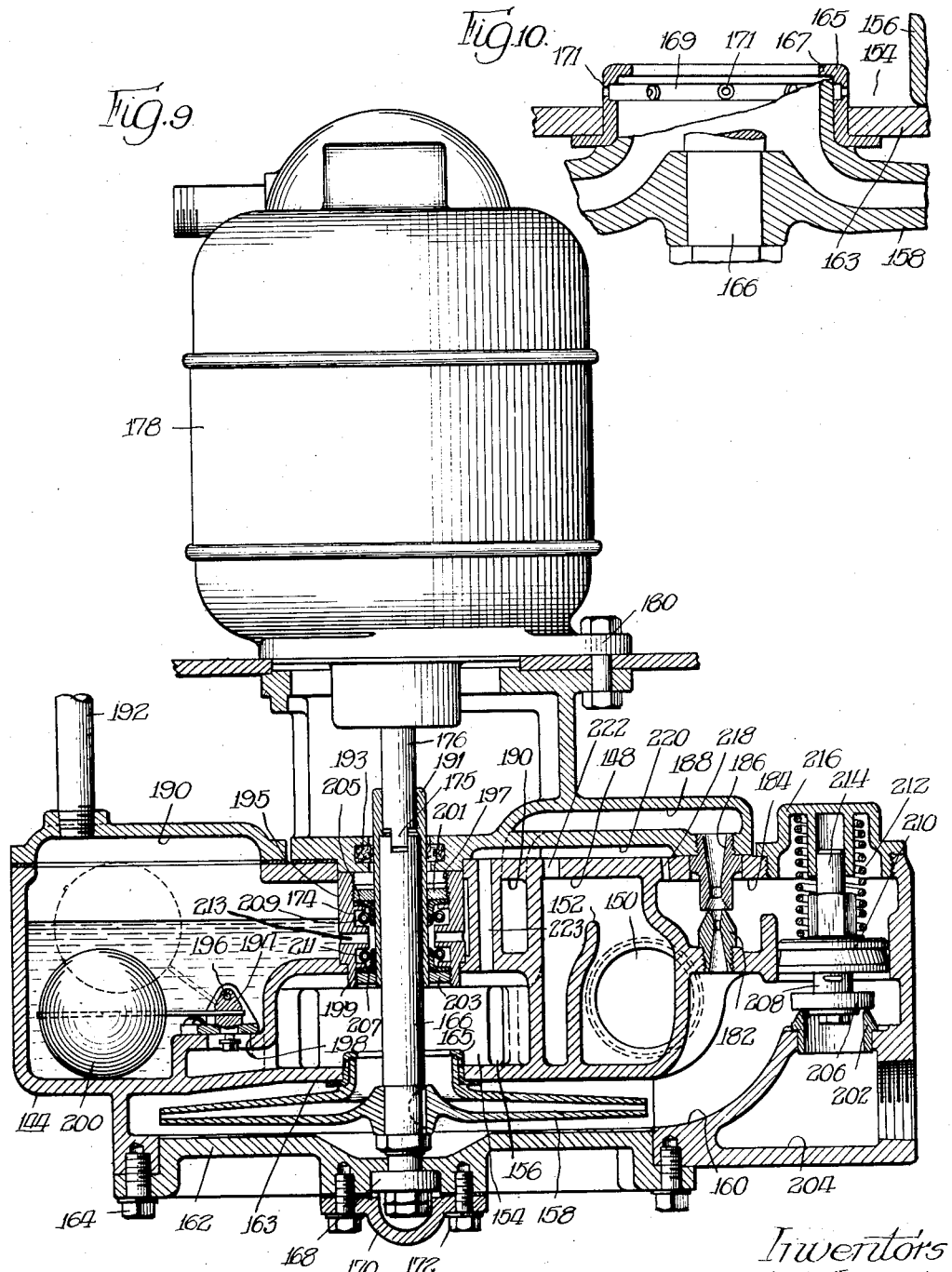

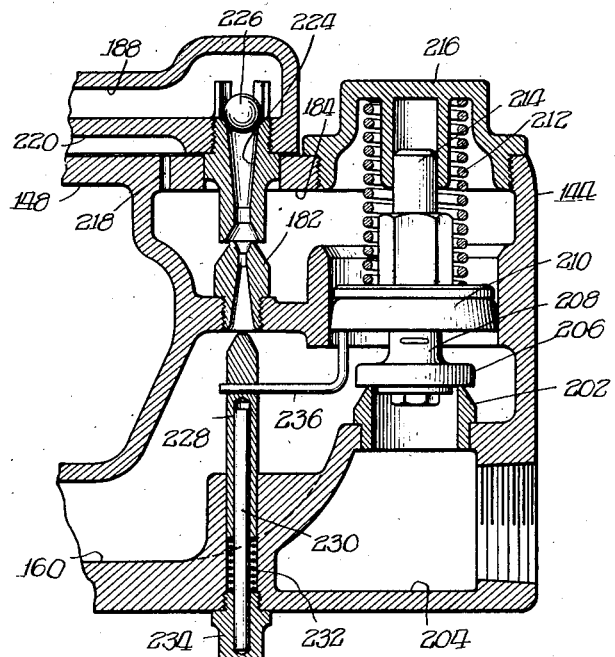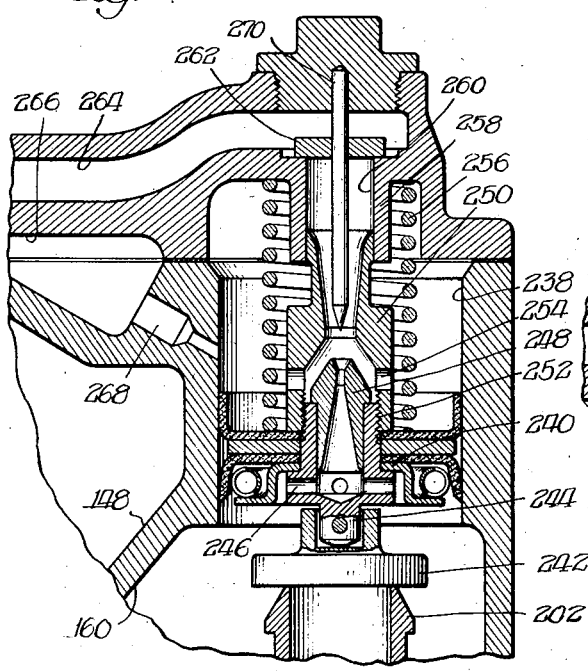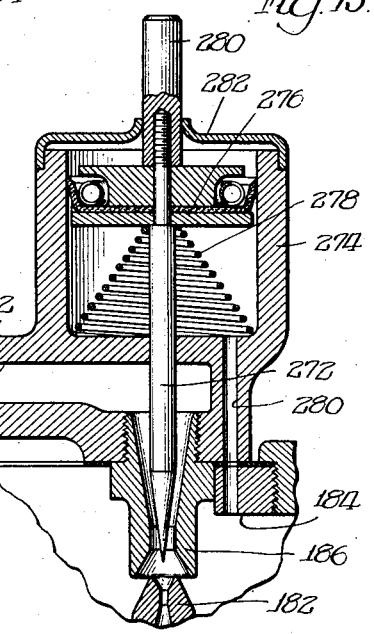

July 26, 1938.  R. J. JAUCH ET AL  2,124,681
LIQUID DISPENSING APPARATUS
Filed June 15, 1936  16 Sheets-Sheet 8

Inventors:
Robert J. Jauch,
Byron J. Pepper

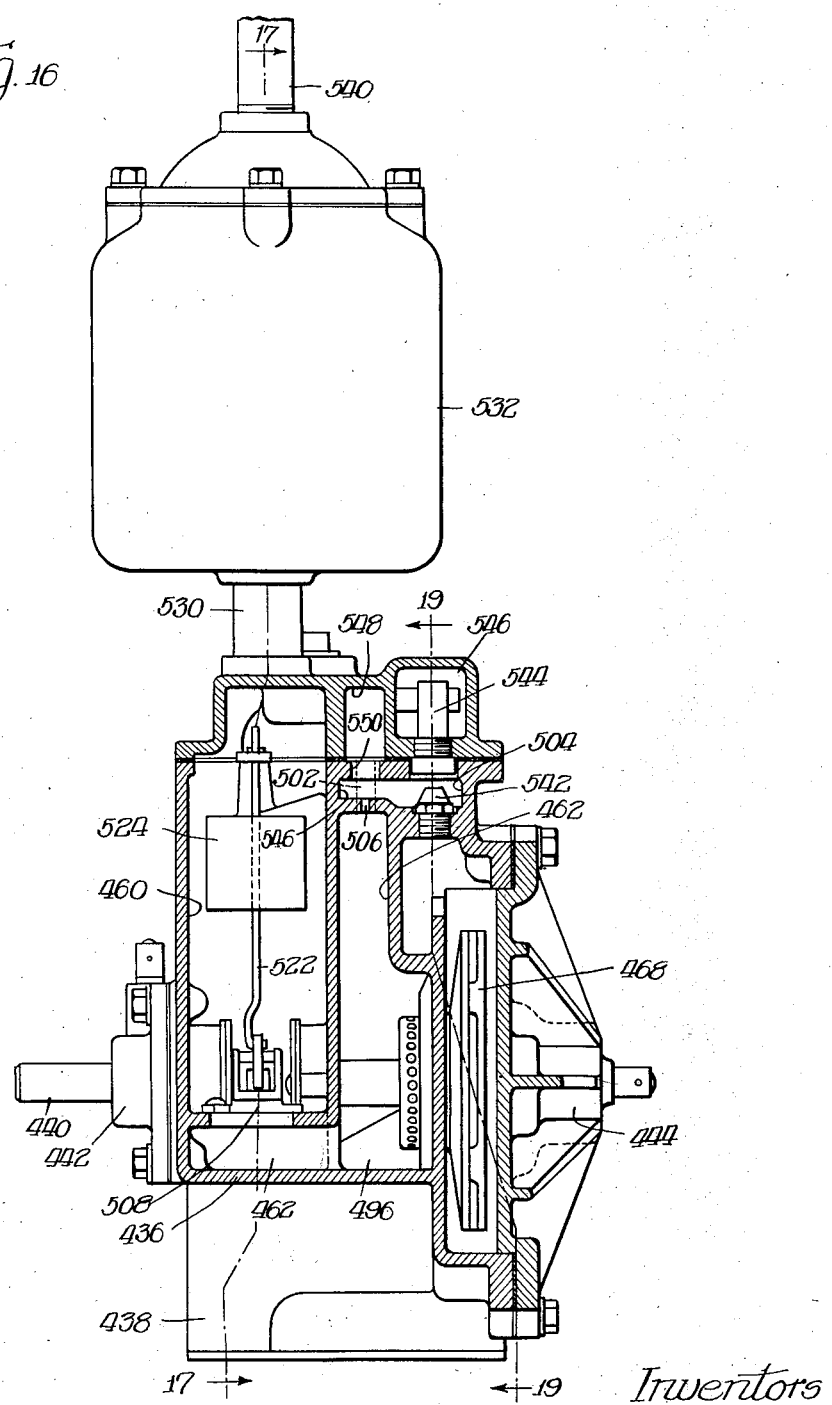

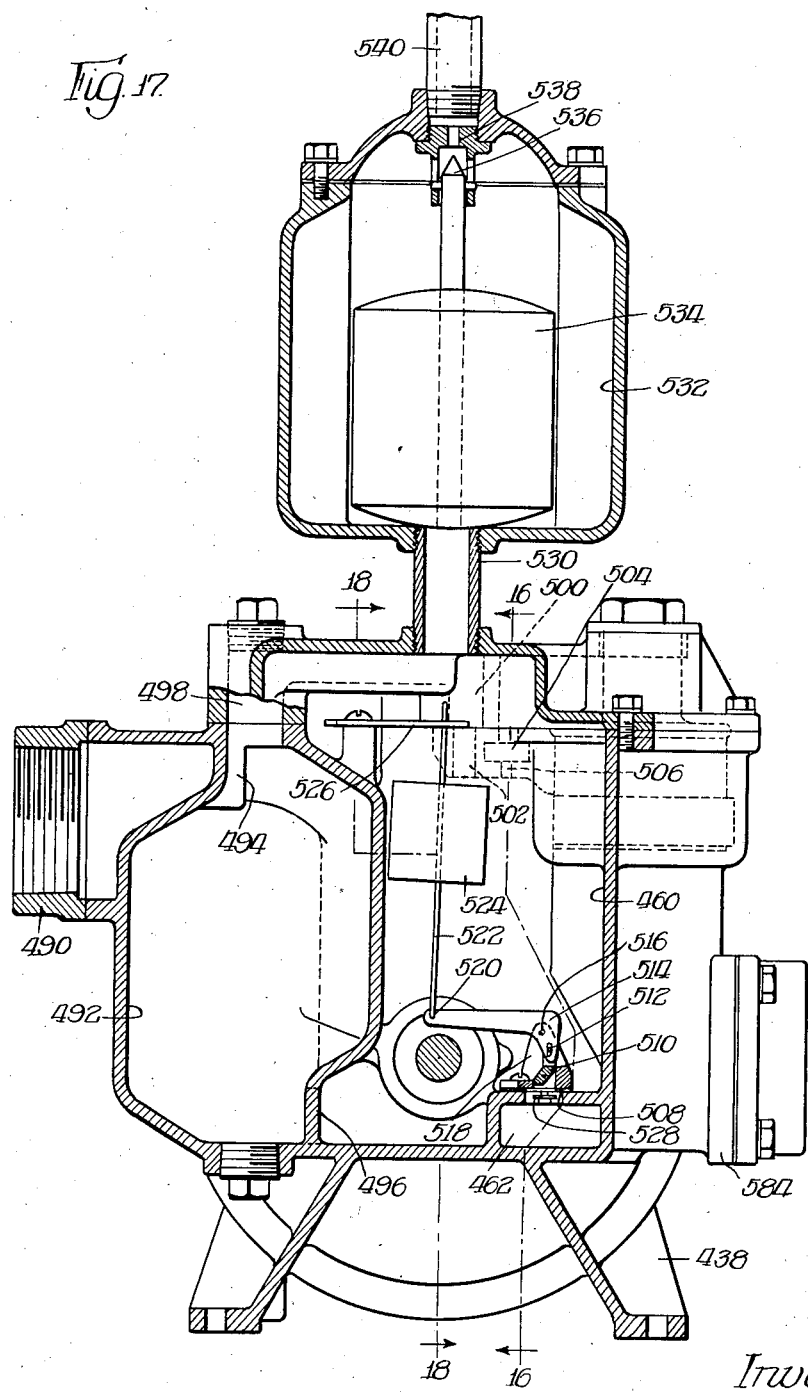

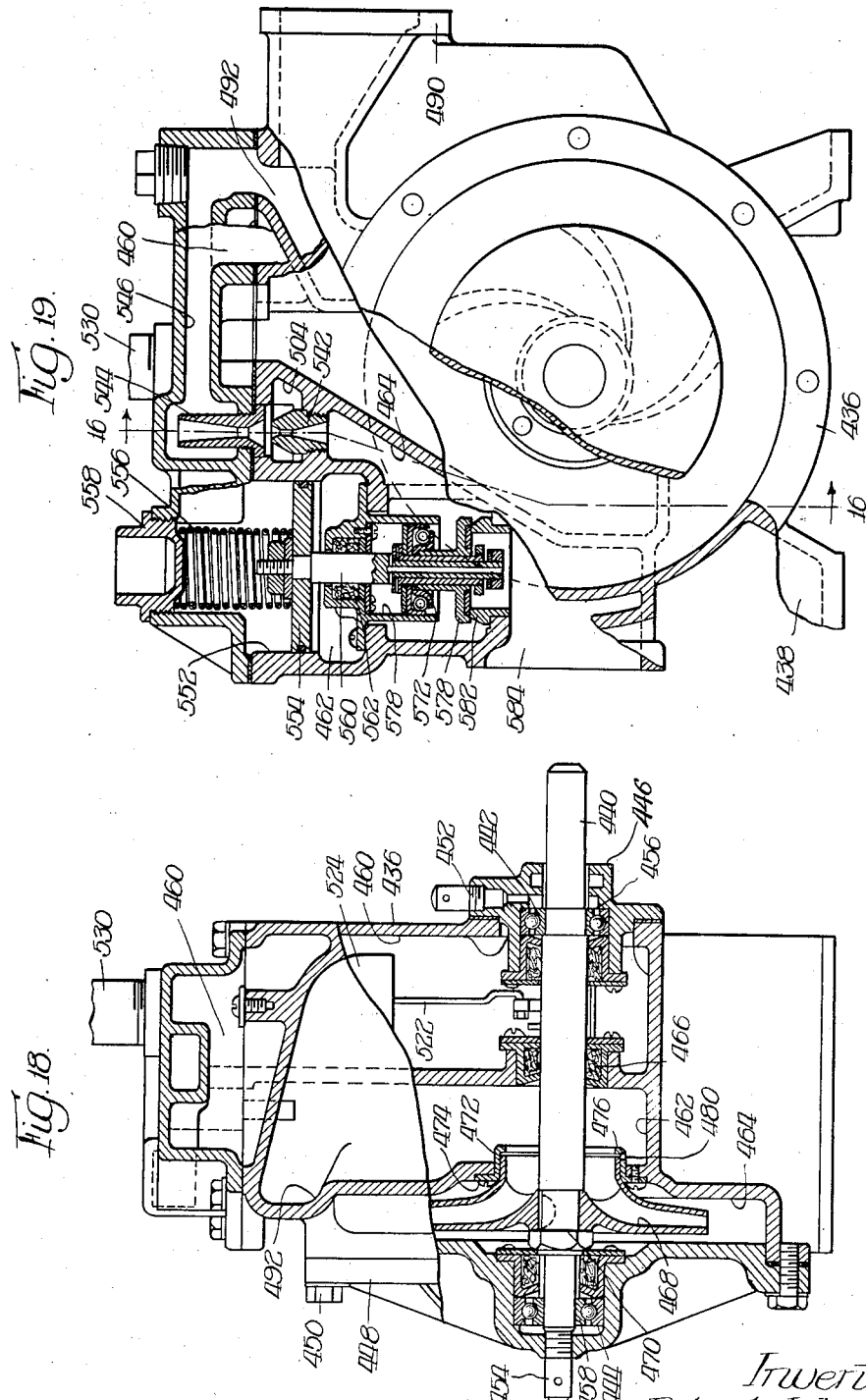

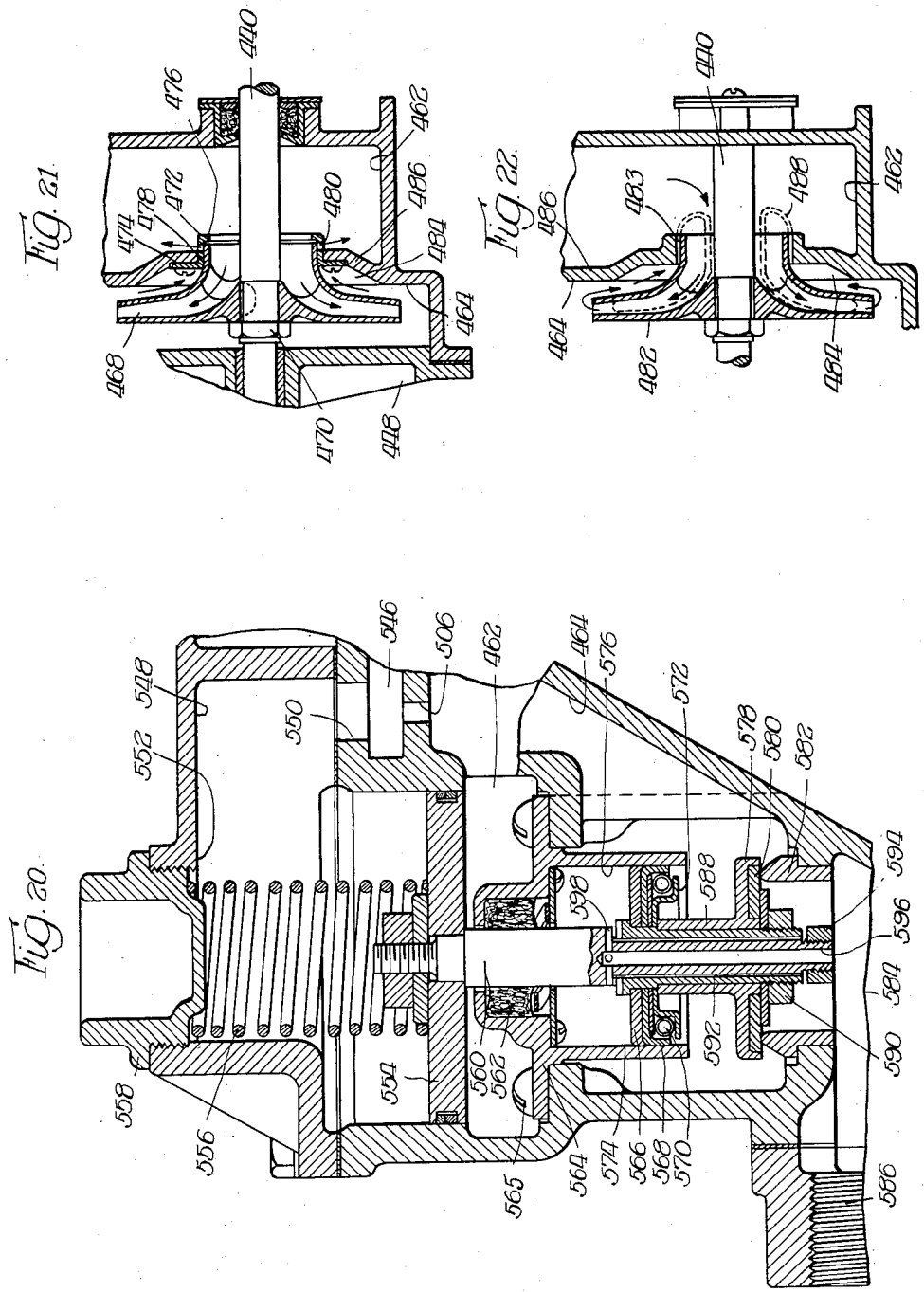

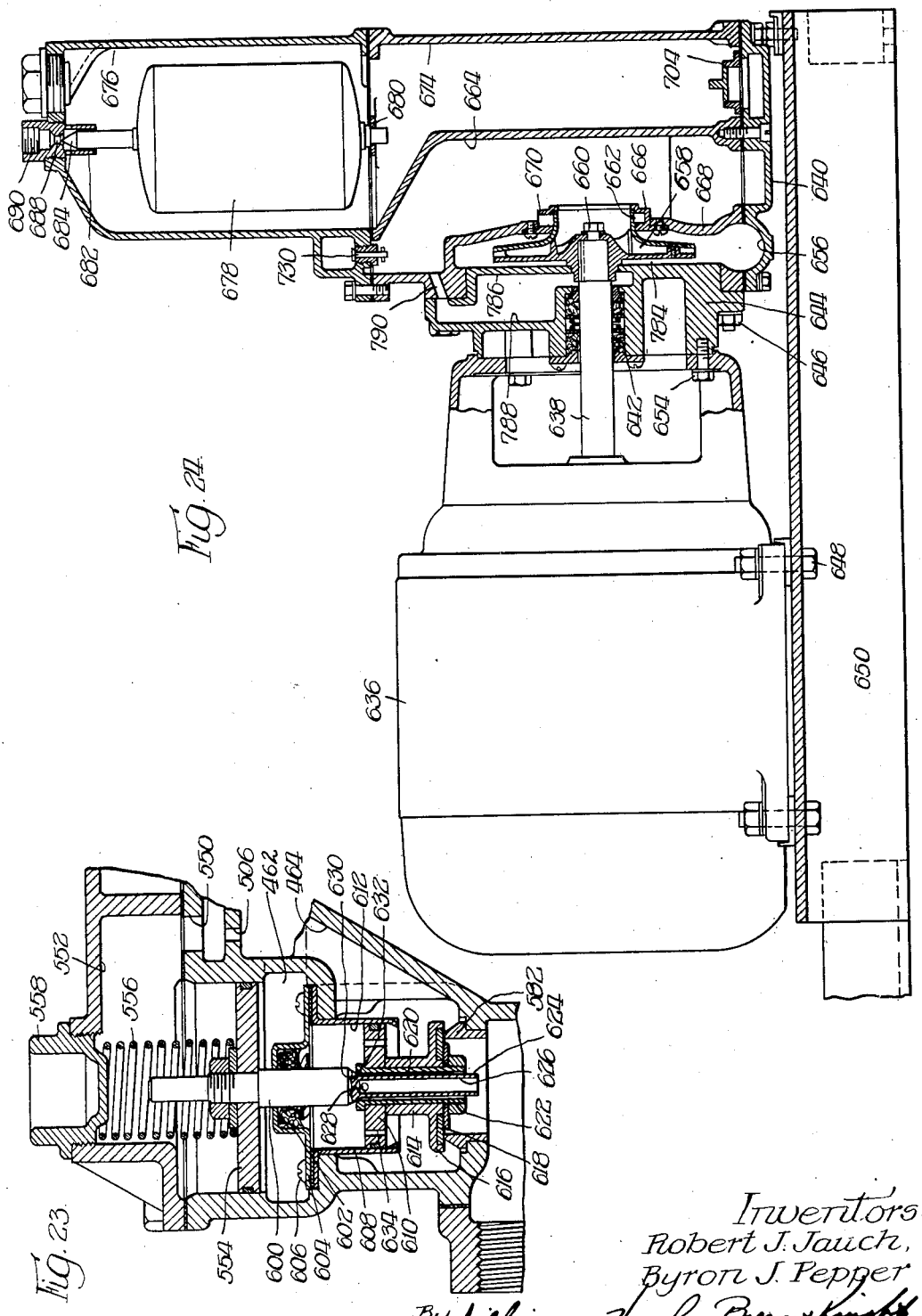

July 26, 1938.  R. J. JAUCH ET AL  2,124,681
LIQUID DISPENSING APPARATUS
Filed June 15, 1936   16 Sheets-Sheet 14

Inventors:
Robert J. Jauch,
Byron J. Pepper,

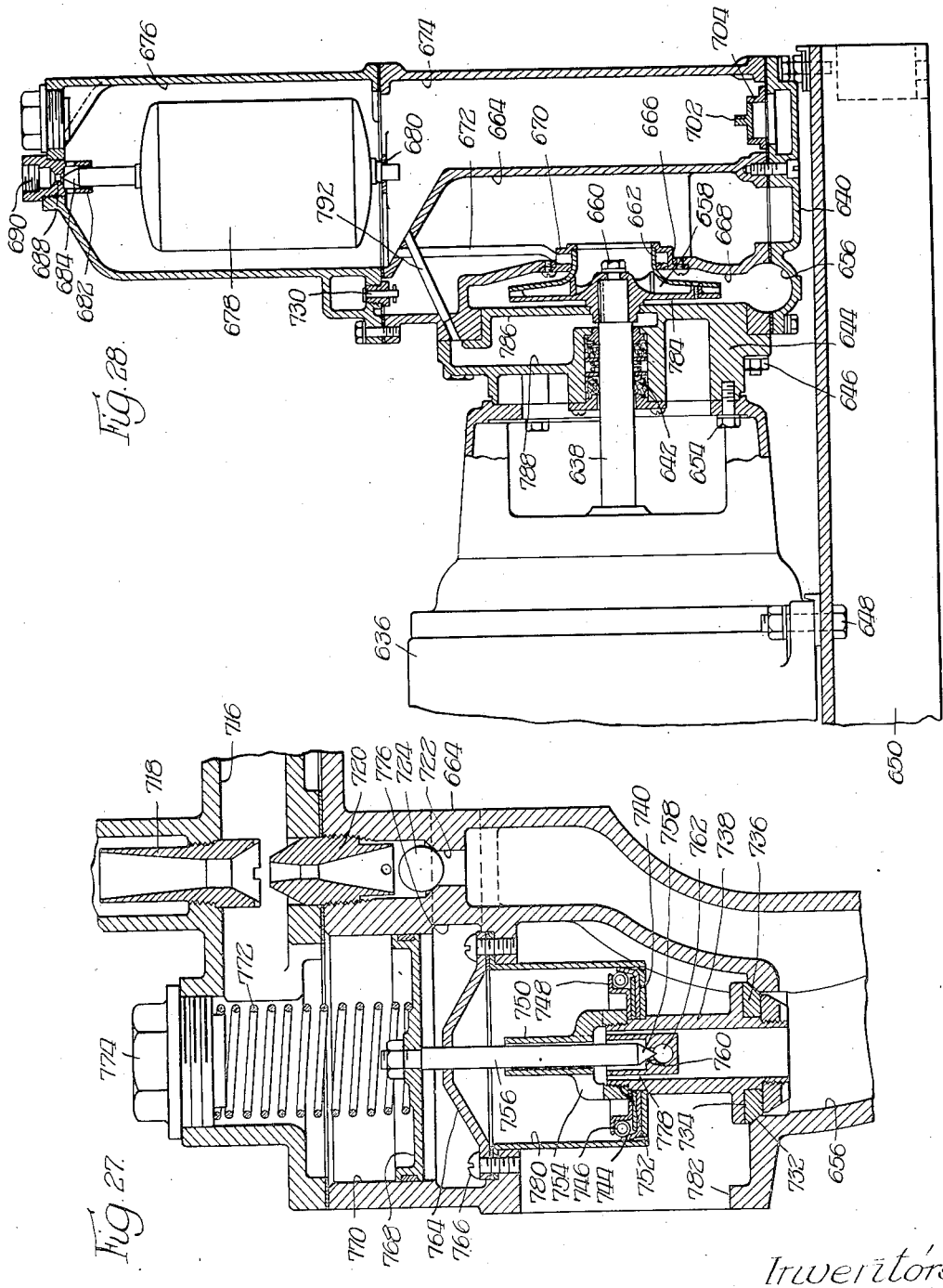

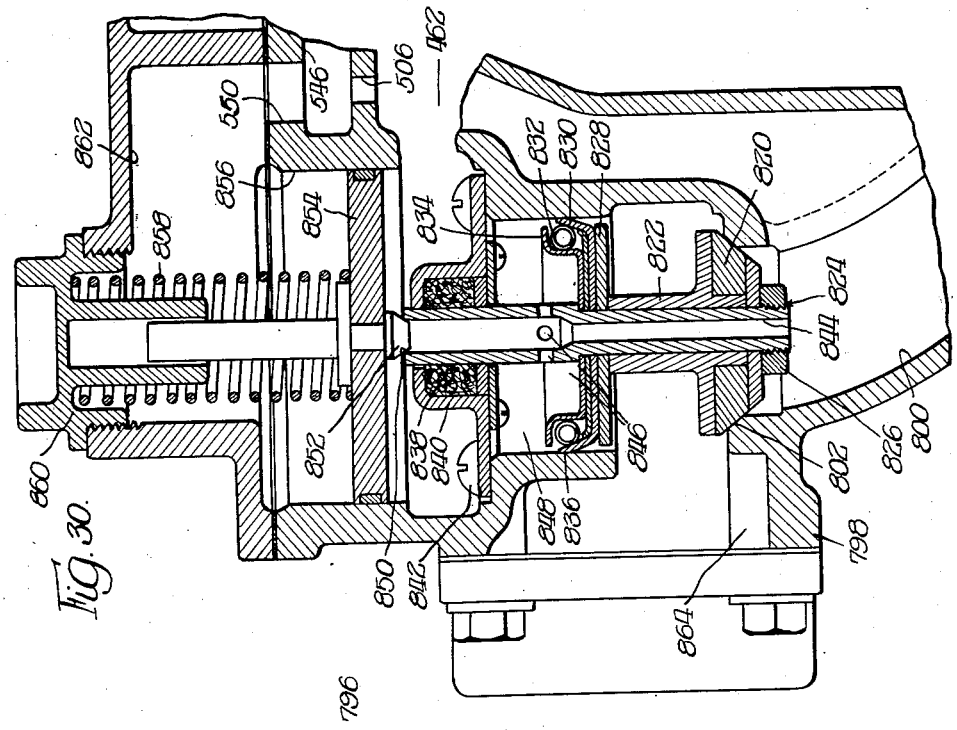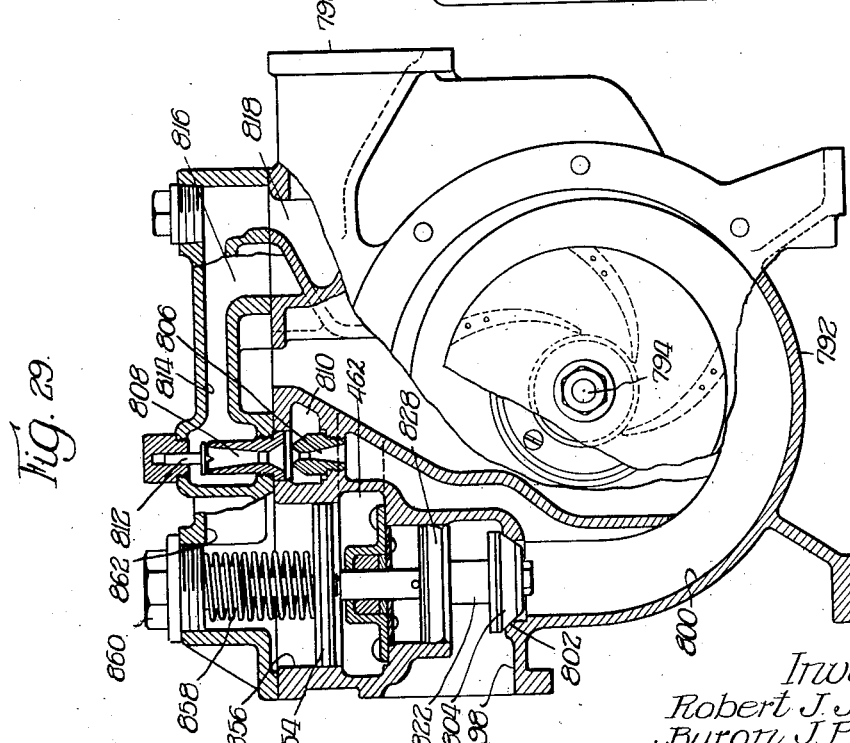

Patented July 26, 1938

2,124,681

UNITED STATES PATENT OFFICE 2,124,681

LIQUID DISPENSING APPARATUS

Robert J. Jauch and Byron J. Pepper, Fort Wayne, Ind., assignors, by mesne assignments, to The Wayne Pump Company, Fort Wayne, Ind., a corporation of Maryland Application June 15, 1936, Serial No. 85,290

20 Claims. (Cl. 103—113)

This invention pertains to liquid dispensing apparatus and pumps to be used in connection therewith, or in connection with installations for dispensing large quantities of liquid rapidly and efficiently as in bulk station installations, city pumping stations, and the like.

It is an object of this invention to provide a liquid dispensing apparatus wherein entrained air is separated from the liquid to be dispensed before the apparatus is operable to dispense clear liquid.

Another object of the invention is to provide a liquid dispensing apparatus wherein liquid is dispensed only after a predetermined pressure is built up.

Still another object of the invention is to provide a liquid dispensing apparatus adapted to use a centrifugal pump or other pumping means but wherein the system is so constructed and arranged that it is self-priming.

Yet another object of the invention is to provide a liquid dispensing apparatus so constructed and arranged that entrained air is separated on the suction side of the pump.

A further object of the invention is to provide a liquid dispensing apparatus which is self-priming and one wherein a centrifugal pump may be used.

A still further object of the invention is to provide a liquid dispensing apparatus wherein the removal of entrained air is effected through use of an ejector.

Yet another object of the invention is to provide a liquid dispensing apparatus wherein entrained air is eliminated through use of an ejector where the ejector may be controlled after air elimination.

Another further object of the invention is to provide a liquid dispensing apparatus operable to dispense liquid only after a predetermined pressure is built up, but one which is effective without a substantial adjustment regardless of the lift of liquid from a source of supply to the pump of said apparatus.

A different object of the invention is to provide a pumping unit operable after a predetermined pressure is built up but remaining operable under another predetermined pressure.

A still different object of the invention is to provide a centrifugal pump of high efficiency and one in which liquid is not dispensed until after air or vapor has been eliminated through use of of an ejector construction.

With these and various other objects in view, the invention may consist of certain novel features of construction and operation as will be fully described and particularly pointed out in the specification, drawings and claims appended hereto.

In the drawings, which illustrate embodiments of the device and wherein like reference characters are used to designate like parts—

Figure 1 is a fragmentary sectional elevation through one arrangement of liquid dispensing apparatus embodying the invention, the same being more or less diagrammatic in its showing;

Figure 2 is a fragmentary elevation of a portion of a liquid dispensing apparatus illustrated in Figure 1 showing a by-pass control;

Figure 3 is an elevation corresponding to Figure 1 showing a modification thereof;

Figure 4 is an enlarged sectional elevation through a modified form of motor driven pumping and ejector unit, the same being taken substantially in the plane as indicated by the line 4—4 of Figure 5;

Figure 9 is an enlarged sectional elevation corresponding to Figure 4, the arrangement of parts, however, being developed in order to bring the various parts in a single plane, the section being taken subsantially in the planes as indicated at 9—9, 8a—8a and 9a—9a of Figure 5;

Figure 10 is an enlarged fragmentary sectional elevation taken through the impeller, the impeller collar and the eddy chamber of the pump construction illustrated in Figures 4 to 9 inclusive;

Figure 11 is an enlarged sectional elevation through the jet and differential valve construction showing a modification thereof for control of said jet;

Figure 12 is an enlarged sectional elevation through the jet and differential valve construction showing another modification thereof for control of said jet;

Figure 13 is an enlarged sectional elevation through the jet showing still another modified form of jet control;

Figure 16 is an elevation, partly in section, of a horizontal type of pump embodying the invention, the section being taken substantially in the planes as indicated by the line 16—16 of Figure 17, and the line 16—16 of Figure 19;

Figure 17 is a transverse sectional elevation of the pump illustrated in Figure 16, the section being taken substantially in the plane as indicated by the line 17—17 of Figure 16;

Figure 18 is a sectional elevation taken substantially on the drive shaft of the pump shown in Figure 16, the section being taken substantially in the plane as indicated by the line 18—18 of Figure 17;

Figure 19 is a transverse elevation, partly in section, of the pump illustrated in Figure 16, the section being taken substantially in the plane as indicated by the line 19—19 of Figure 16;

Figure 20 is an enlarged sectional elevation through the outlet valve mechanism of the pump illustrated in Figure 16;

Figure 21 is a sectional elevation through the drive shaft and impeller, showing the impeller collar applied thereto;

Figure 22 is a sectional elevation corresponding to Figure 21 showing the conventional mounting of the impeller of a centrifugal pump;

Figure 23 is an enlarged sectional elevation through a modified form of valve construction illustrated in Figures 16 to 20 inclusive;

Figure 24 is a side elevation, partly in section, of yet another modified form of horizontal centrifugal pump;

Figure 27 is an enlarged sectional elevation through the check valve assembly illustrated in Figure 26;

Figure 28 is a fragmentary sectional elevation corresponding to Figure 24, showing modifications thereof;

Figure 29 is an end elevation, partly in section, of another modified form of pump construction embodying the invention, the section being taken through the check valve and jet chamber;

Figure 30 is an enlarged sectional elevation of the check valve assembly illustrated in Figure 29.

Figure 5:
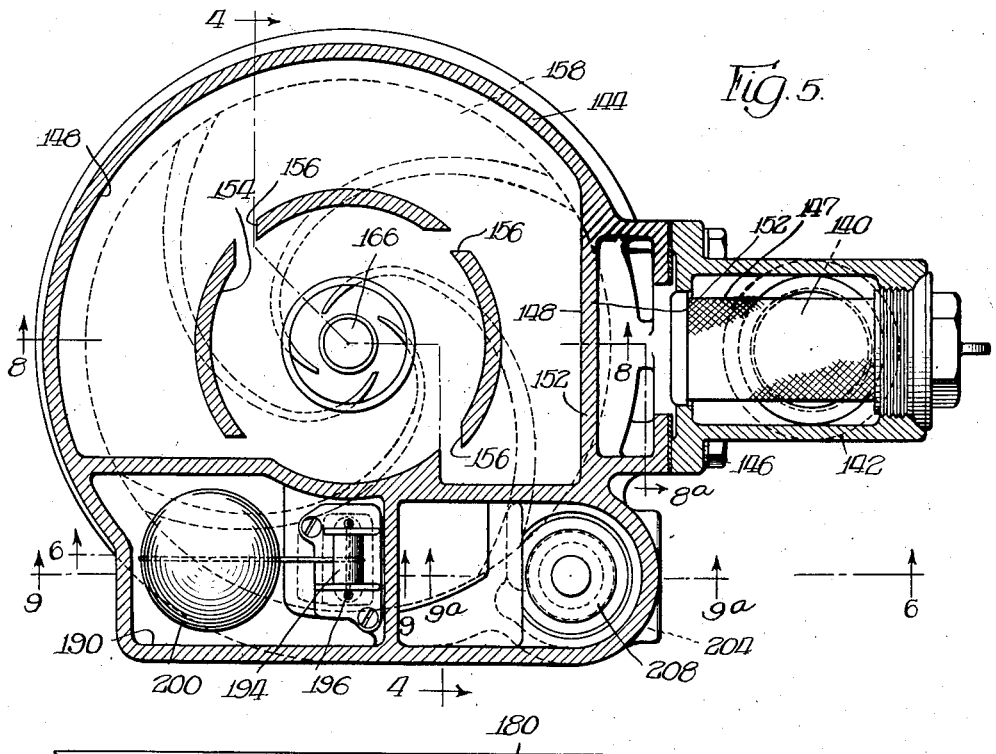
Figure 5 is an enlarged sectional plan taken substantially in the plane as indicated by the line 5—5 of Figure 4, and substantially at 90 degrees to said figure.

Referring first of all more particularly to the forms of construction illustrated in Figures 1 to 3 inclusive, it is of course to be understood that in these and subsequent forms where the pump is used in a liquid dispensing apparatus, said apparatus is adapted to be provided with a suitable casing, such as illustrated in application Serial No. 2,282, filed January 17, 1935, and a meter similar to that illustrated in application Serial No. 85,426, filed June 15, 1936, may be used to drive registering mechanism such as shown in application Serial No. 628,868, filed August 15, 1932. The suction line 20 is adapted to be connected to a suitable source of supply (not shown), the end of the suction line being provided with the usual foot valve (also not shown). The suction line is connected to the inlet side of the pump 22 which, as shown, is of the centrifugal type adapted to be driven by a suitable motor controlled by a suitable switch, the switch operating means preferably being adapted to be disposed adjacent a hose support, all as shown in said first named application.

The pump 22 is provided with an impeller 24 rotated by the impeller shaft 26 driven by said motor, the pump being provided with the suction, sump or eddy chamber 28 on the suction or inlet side thereof which communicates with the center of the impeller 24. On the outlet side of the pump there is provided a discharge or impeller chamber 30, said chamber being connected through the differential valve 32 to the discharge conduit 34. Said conduit is connected to the inlet side of the meter 36 and the meter being provided with a suitable meter shaft 37 for operating the registering mechanism 38, the meter shaft rotating proportionately to the amount of liquid passing through said meter. The outlet side of the meter is connected through the conduit 40 and sight gauge 42 to the discharge hose 44, the end of said discharge hose being provided with a suitable discharge nozzle 46 provided with the normally closed discharge valve 48 controlled by the hand lever 50.

An ejector conduit 52 extends within the suction chamber 28 having communication therewith adjacent the top thereof through the aperture 54, the inner end 56 of said conduit terminating adjacent the center of the impeller. The conduit 52 is provided with the one-way check valve 58 preventing return flow to the center of the impeller, said check valve in the modification shown in Figure 1 being connected through the pipe 60 to the throttle orifice 62 disposed adjacent the ejector 64. The jet conduit 66 extends into the discharge chamber 30 and may be provided with an aperture adjacent the top of said chamber as at 68. The conduit 66 is likewise connected to the ejector 64, the ejector jet 70 being in communication with the conduit 66. The jet is of the Venturi type and extends toward the ejector tube 72, likewise in communication with the throttle orifice 62, the tube being connected through the conduit 74 to the air separator or float chamber 76 which is vented to the atmosphere through the vent pipe 78 extending to a high point in the liquid dispensing apparatus. The float chamber 76 is provided with the float 80 connected to one end of the dead lever 82, the other end of said lever being connected as at 84 to a suitable bracket 86 provided in the air separator, said lever being provided with the float valve 88 adapted to control the float return 90. The float return is connected through the conduit 92 to the suction chamber 28 of the pump.

The differential valve 32 consists essentially of the valve chamber 94 within which is disposed the valve member 96, the upper end of said member being provided with the valve disc 98 adapted to have seating engagement with the valve seat 100. The lower valve disc 102 is of larger diameter than the valve disc 98 and the valve member is normally urged to closed position by the spring 104. In order to obviate the necessity for an adjustment or for the use of different springs 104 for different lifts of installation, an equalizer conduit 106 is connected as at 108 to the valve housing 94 below the valve disc 102, the opposite end of said equalizer conduit 106 being connected as at 110 to the suction line 20.

In the operation of this form of the device, assuming that the liquid dispensing apparatus is dry, liquid is poured into the float chamber 76 until the float 80 lifts the valve 88 and permits liquid to flow through the connection 92 into the suction chamber 28, or liquid may be supplied directly to the suction chamber 28. The pump is primed to such an extent that liquid passes into the discharge chamber and starts to fill up the periphery of the impeller 24. The switch is then closed to start the motor which causes rotation of the shaft 26 and the impeller 24. Rotation of the impeller produces a pressure in the discharge chamber 22 causing liquid to flow through the conduit 66 and through the ejector 64 to the connection 74 and into the float chamber 76.

The action of the jet 70 of the ejector causes withdrawal of the air from the pump through the ejector conduit 52, this conduit drawing air through its inner end adjacent the impeller and through aperture 54. Continued rotation of the impeller acts upon the liquid in the pump to cause it to pass continually through the jet conduit 66 and thence through the jet 70 of ejector 64 and creates sufficient vacuum to slowly draw the liquid through the suction line 20 from the source of supply. While this priming action is being accomplished no liquid is being discharged through the discharge conduit 34, as the differential valve 96 remains closed having been set to open only at a predetermined pressure, which pressure cannot be built up for so long as any air is present in the system. After sufficient pressure is generated to open the differential valve 96, and this pressure can only be reached when the impeller and suction chamber are entirely filled with liquid, the liquid passes through discharge pipe 34, meter 36 and then is discharged through the conduit 40, visi-gauge 42, hose 44 and through the nozzle 46, it being understood that the nozzle valve is in open position.

Passage of liquid through the meter causes the meter to operate the register to indicate the quantity of liquid dispensed and preferably the price thereof. The differential valve having once been opened, the full area of the disc 102 becomes effective and the equalized suction, due to the connection 106, maintains the valve in a constant open position. During the operation of the pump the ejector continues to operate even after the system is cleared of air. Any vaporization due to heat or agitation, or any air due to leaks into the system, will be drawn through the ejector and expelled into the air separator, where it is vented through the vent pipe 78 so that there will be no discrepancies between the amount of liquid measured and the amount of liquid dispensed.

However, if the installation has not been properly made, or if more air leaks into the system than the jet can expel, the pump will not produce enough vacuum to draw liquid from the source of supply. If a leak should develop after installation and the liquid in the suction chamber should fall below the center of the impeller, the drop in vacuum together with the reduction of centrifugal action will cause the spring 104 to close the differential valve 96 against the pressure of the liquid in the discharge side of the pump before any air is admitted to the meter. This action would also occur if the source of supply should become empty.

In the construction shown in Figure 2, the same liquid dispensing apparatus is contemplated as that illustrated in Figure 1. In this construction however a sylphon or expansible bellows 112 is connected to the discharge pipe 34 and controlled by the pressure of the liquid passing through the discharge pipe. The sylphon is operatively connected as at 114 to the valve lever 116 of the valve 118 disposed in the jet conduit 66. Before the differential valve 96 is opened by the predetermined pressure of the liquid delivered by the impeller, the valve 118 is fully opened and the system operates as described above. After the differential valve has been opened and liquid is being dispensed, the pressure of said liquid causes operation of the sylphon 112 to either close the valve to render the jet conduit inoperative, or it may be set to merely throttle the jet conduit to reduce the amount of liquid circulated or by-passed through the ejector.

In the construction illustrated in Figure 3, the one-way check valve 120 is disposed in the ejector conduit 52 in place of the check valve 58. The throttling orifice 122 is disposed adjacent the check valve 120 instead of adjacent the ejector 64, and a conduit 124 is connected to the pipe 60 as at 126 between the throttling orifice and the ejector, the other end of said conduit 124 being connected as at 128 to the differential valve housing 94 below the differential valve 96. This connection replaces the connection 108 in the modification illustrated in Figure 1. A sylphon 130 communicates with the conduit 60 adjacent the throttling orifice 122 and said sylphon is operatively connected as at 132 to the operating lever 134 of the throttling valve 136 provided in the jet conduit 66.

In the operation of this form of the device, before the differential valve 96 is opened, the throttling valve 136 is in full open position so that the system functions exactly as has been described with respect to the modification illustrated in Figure 1. When, however, the differential valve 96 is opened by building up the predetermined pressure, the sylphon 130 is operated to partly close the valve 136 to cause throttling action of said valve, thus decreasing the amount of liquid by-passed through the jet conduit 66, float chamber 76 and return conduit 92.

Referring now more particularly to the form of construction illustrated in Figures 4 to 10 inclusive, the suction line 140, corresponding to the suction line 20, is connected through the fitting 142 to the casing 144 as at 146, the fitting including a strainer 147 therein. The suction line communicates with the suction chamber 148 through the suction opening 150, said suction chamber being provided with the upstanding baffle 152 for maintaining a predetermined liquid height in the pump casing when the pump is inoperative. The suction chamber 148 communicates with the eddy chamber 154 through the passage 156, the eddy chamber being in communication with the center of the impeller 158 mounted in the impeller chamber 160, said chamber being closed by means of the end cover plate 162 secured as at 164 to the casing 144.

The impeller 158 is horizontally disposed and is mounted on the impeller shaft 166, said shaft being supported at the lower end on the thrust bearing 168 fastened by the end plate 170 secured as at 172 to the cover plate 162. In order to prevent the impeller from becoming air bound, as will be more particularly discussed, the lower wall 163 of the eddy chamber 154 is provided with an impeller collar 165 secured to said wall and extending upwardly and provided with the inwardly directed flange 167, Figure 10, overlying the top or inlet rim of the impeller 158. The collar is provided with an internal angular groove 169 having radial holes 171 provided therein, communicating with the eddy chamber 154.

With this construction any upward surge of liquid between the impeller and the impeller collar is broken by the groove 169 so that very little liquid is supplied past the flange 167, most of this liquid being trapped and flowing gently outwardly through the apertures 171 so that there will be no wall of liquid pumped into the eddy chamber to prevent flow of liquid from the eddy chamber into the impeller, which wall would, of course, cause the impeller to become air bound and consequently the pump inoperative.

The vertically extending impeller shaft 166 extends through the stuffing box 174 and is secured by the driving connection 175 to the vertically extending motor shaft 176 adapted to be driven by the motor 178, said motor being suitably secured as at 180 to supporting means fastened within the liquid dispensing apparatus casing. It is understood of course that the motor is controlled by a suitable switch as illustrated in the first named of the above identified applications.

The impeller chamber 160 is provided with the Venturi jet 182 extending into the jet chamber 184, said jet being in alignment with the ejector tube 186 which communicates with the ejector line or passage 188, said passage communicating with the float or settling chamber 190. The jet and ejector tube therefore form ejecting means for the jet chamber.

In order to prevent leakage from the float chamber, the shafts 166 and 176 are provided with a tight sleeve 191 for maintaining the shafts in alignment and for guiding the motor shaft, and a suitable packing such as a felt seal ring for exclusion of dust or dirt is provided in the pocket 193 disposed in the upper portion of the pump casing. The stuffing box 174 may include the gland and leather retainer 195 threaded as at 197 and 199 for the reception of the nuts 201 and 203, said nuts forming securing means for the outwardly extending flanges of the leathers 205 and 207, the free or axially disposed flanges of said leathers being spring pressed against the sleeve 191 by means of the springs 209 and 211. In order to maintain the seal around the sleeve 191 and to prevent leakage of liquid from the casing, the gland 195 is provided with the axially extending channels 213 disposed between the leathers 205 and 207 whereby liquid entering the channels will tend to seal the axially disposed leather flanges against said sleeve, and any leakage through the packing or leather 207 will cause liquid to be drawn into the suction chamber instead of air.

The float chamber 190 is provided with the vent 192 extending to a high point in the liquid dispensing apparatus for releasing the separated air from the float chamber and consequently from the pump. A float valve 194 is pivotally mounted as at 196 in the float chamber and is adapted to control the float return 198, said float return being in communication with the eddy chamber 154. The valve 194 is a throttling valve and is only in closed position when the float 200 is substantially in the horizontal position, that is, when the liquid in the float chamber has reached a predetermined level.

The outlet valve seat 202 is disposed between the impeller chamber 160 and the discharge chamber 204, said discharge chamber being adapted to be suitably connected to the discharge pipe leading to the meter corresponding to pipe 34. The valve seat 202 is adapted to be closed by the valve disc 206 of the differential outlet valve 208, the upper disc 210 of said differential valve separating the jet chamber 184 and the impeller chamber 160 and said differential valve is normally urged toward closed position by means of the coil spring 212 embracing the valve stem 214 which is guidably mounted in the cap 216.

In order to complete the communicating means necessary to completely exhaust air and vapor from the casing 144, the jet chamber is connected through orifice 218 with the passage 220, said passage in turn being connected to the suction chamber 148 through orifice 222 and to the eddy chamber 154 through the passage 223. Thus the ejector is effective throughout the entire casing.

In operation of this form of the device, assuming the liquid dispensing apparatus to be inoperative, liquid will not drain back from the pump casing 144 through the suction opening 150 below a level determined by the baffle 152, the baffle acting as a trap so that the impeller 158 will always be submerged. Upon starting the motor, rotation of the shaft 166 by the shaft 176 generates a force by means of the centrifugal action of the impeller, building up a pressure in the impeller chamber 160. Liquid flows through the jet 182 and is replaced by the reserve liquid in the eddy chamber. The action of the jet upon the air and vapor in the jet chamber 184 causes it to be drawn out with the stream of liquid passing through the ejector tube 186, producing a partial vacuum in the jet chamber 184 drawing air from the suction chamber through passage 220 and from the eddy chamber through passage 156.

The air and liquid will pass through the ejector line 188 into the float chamber 190 where the air will be separated from the liquid and will pass outwardly of the pump through the vent 192. The clear or solid liquid will then pass through the float return 198 to the eddy chamber 154. When the air in the suction and eddy chambers has been replaced by liquid from the float chamber 190, the valve 194 throttles due to the drop of the liquid in the float chamber 190. The valve preferably does not close entirely although the clearance of the swinging valve 194 and its adjacent seat is so small that the amount of liquid passing through will not take care of the displacement produced by the ejector. The vacuum thus produced draws liquid through the suction line from the source of liquid supply to the suction chamber 148. When air has been entirely removed from the suction chamber and clear liquid passes through the ejector, the vacuum in the jet chamber 184 is increased to such an extent that the action of the pressure in the impeller chamber 160, in addition to the vacuum in the jet chamber 184, causes upward movement of the differential valve 208 against the action of the spring 212 and allows liquid to flow from the impeller chamber 160 to the discharge chamber 204 and thence outwardly to the meter.

Due to the use of the differential valve, the valve will open at a higher pressure than that at which it closes so that it can be made to open only when air is entirely eliminated, but will continue to operate without halting should a considerable portion of entrapped vapor wash up out of the suction line, in which case the delivery from the pump will be diminished, and the jet will function to by-pass the entrained air to the float chamber for separating operation.

In the construction shown in Figure 11, the jet 182 is aligned with the ejector tube 224 corresponding to the ejector tube 186, the tube 224 being provided with a ball valve 226 adapted to prevent return flow from the ejector line 188 to the jet chamber 184. The valve member 228 is mounted on the stem 230 and is normally urged upwardly by means of the spring 232 interposed between the seat 234 and the valve member 228. The valve member is connected through the arm 236 to the differential valve 208. The valve member 228 may be so proportioned that it either completely closes the jet 182 when the differential valve is opened, or may only throttle the action of the jet. In either event the by-passing of the clear liquid, after elimination of air and the opening of the differential valve due to building up of the predetermined pressure, is controlled.

Another form of throttling device is illustrated in the construction shown in Figure 12. In this case the jet chamber 238 is disposed directly above the differential valve 240, the lower disc 242 thereof being adapted to control the seat 202 in the manner already described. In this case the valve stem 244 of the differential valve is provided with the channels 246 in communication with the jet 248, corresponding to the jet 182, the jet 248 being mounted in said valve stem. The ejector tube 250 is secured as at 252 to the differential valve stem and is in communication through the ports 254 with the jet chamber 238.

As before, the differential valve is urged toward seated position by means of the coil spring 256. The ejector tube 250 is movable upwardly through the guides 258, said guides forming a channel 260 closed by means of the one-way valve 262 mounted to prevent return through the ejector line 264, corresponding to the ejector line 188. The suction chamber communicates with the jet chamber through the passages 266 and 268 corresponding to passages 220 and 218. The valve member 262 is slidably mounted on the downwardly extending guide member 270, said member extending into the ejector tube and being adapted to throttle the action of the jet 248 when the valve has been opened, upon the building up of the predetermined pressure, thus diminishing the amount of liquid by-passed while the liquid dispensing apparatus is being operated to dispense liquid.

Still another form of throttling means for the ejector is illustrated in Figure 13. In this case the jet 182 is disposed adjacent the ejector tube 186 and the throttling member 272 extends downwardly towards the jet 182 through the ejector tube 186. The member 272 is mounted in the housing 274 and is provided with the piston member 276 normally urged upwardly by means of the coil spring 278. The piston rod 280 extends upwardly and is guided by the cap 282, which acts as a closure member for the housing 274. The underside of said piston member 276 is subjected to the partial vacuum induced in the housing 274, said housing, by the action of the ejector in the jet chamber 184, being connected to said jet chamber through the passage 280. In this form of the device the increased suction built up in the jet chamber 184 when clear liquid is being pumped and the differential valve has been opened, causes the piston 276 to move downwardly against the action of the spring 278, to throttle the ejector through the member 272, and this member is effective until the pressure in the chamber decreases due to the introduction of air therein, in which case the spring 278 moves the piston upwardly to render the throttling member inoperative to thereby permit the unrestricted passage of vapor to the air separator.

Figure 14:
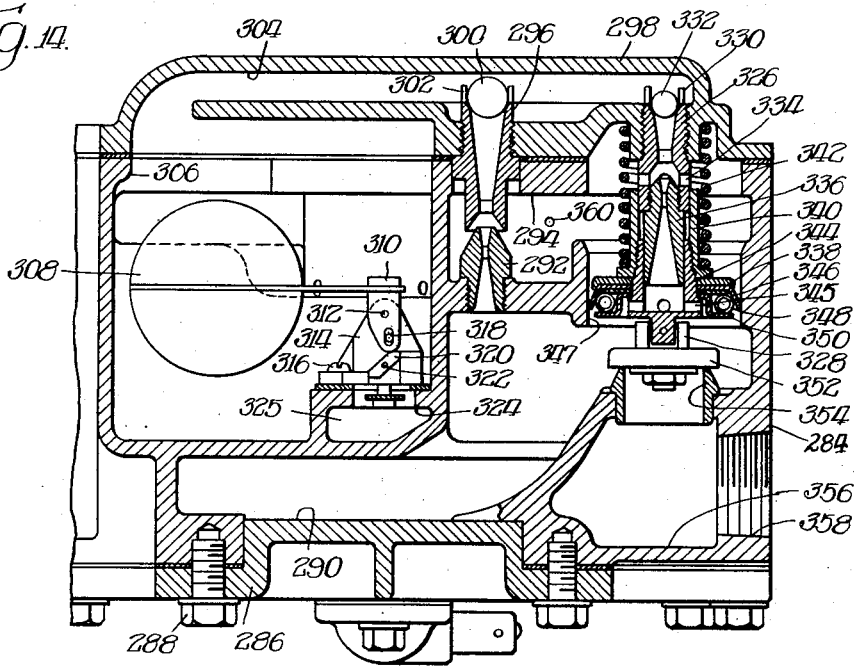
Figure 14 is an enlarged sectional elevation corresponding to that shown in Figure 6, showing yet another modified form of jet control.

In the modification illustrated in Figure 14, a pump similar to that illustrated in Figures 4 to 9 inclusive, is shown. In this construction the pump casing 284, corresponding to the pump casing 144, is closed by the bottom plate 286 through suitable fastening means 288. The impeller chamber 290, corresponding to the impeller chamber 160 formed between said casing and the bottom plate, conducts liquid from the impeller (not shown) to the jet 292, corresponding to the jet 180. The jet 292 is disposed in the jet chamber 294 and said jet is in alignment with the ejector tube 296, corresponding to the ejector tube 186, which is secured in the top plate 298 provided on said casing. The ball check valve 300 is seated in the top of the ejector tube 296, being retained therein by the guides 302, said ball valve being disposed in the ejector line on passage 304, corresponding to the ejector line 188, disposed in the cover 298.

The ejector line communicates with the float chamber 306, corresponding to the float chamber 190, and the float 308 is disposed therein, being secured to the lever 310 pivoted as at 312 to a support 314, secured in said float chamber as at 316. The lever 310 is loosely pivoted as at 318 to the valve 320, pivoted as at 322 to the support 314, said valve controlling the opening 324 of the float return, said float return being in communication with the eddy chamber 325, corresponding to the eddy chamber 154, the liquid level in the float chamber controlling the opening of the valve, the float in its lowermost position completely closing said valve.

The ejector line 304 is also in communication with the auxiliary ejector tube 326, disposed in vertical alignment with the differential valve 328. The ejector tube 326 is secured in the cover plate 298 and is likewise provided with the ball valve guides 330 for the ball valve 332. The ejector tube 326 extends downwardly into the jet chamber 294 and is in communication therewith through the apertures 334. The auxiliary jet 336 is secured in proper spaced relation to the ejector tube and forms a slidable support for the upper piston 338 of the differential valve 328.

The piston 338 is provided with the upwardly extending sleeve 340, slidably mounted on the ejector tube 326, and said piston is urged downwardly by means of the spring 342, disposed between the cover plate 298 and the piston 338. The sleeve 340 is secured to the piston rod 344 which communicates with the impeller chamber 290 through the radial apertures 345. The piston may be of any suitable construction such as one utilizing flanged leathers 346 urged into engagement with the adjacent casing walls 347 by means of the spring 348 positioned by a suitable retainer 350. The piston rod 344 is secured to the discharge valve 352 corresponding to the discharge valve 206, the valve 352 being adapted to be seated on the valve seat 354 controlling communication to the discharge chamber 356 having discharge outlet 358.

Assuming the valve to be in closed position, the liquid contained in the pump will be moved by the impeller upwardly of the impeller chamber 290 through the jet 292 and through the ejector 296. Liquid will open the valve 300 and will pass through the ejector passage 304 to the float chamber. Liquid passing through the ejector will cause a suction through the orifice 360, connecting the jet chamber to the suction chamber, said orifice corresponding to the orifice 218. Suction is also caused by the liquid from the impeller chamber flowing through the apertures 345 and upwardly through the jet 336 through the ejector tube 326 past the valve 332 into the ejector line 304. After the air has been released from the float chamber, and after a suitable liquid level has been reached, the valve 320 will open to permit the liquid to pass into the eddy chamber. When the air is exhausted from the pump casing the suction in the jet chamber will cause the piston 338 to move upwardly against the spring 342, gradually throttling the opening 334 until finally the opening may be completely closed, thus rendering the jet 336 inoperative. Continued upward movement of the piston will cause the lower edge of the jet 336 to close the opening 345 so that no further liquid will pass through the jet and orifice 336, 326, and liquid will be dispensed through the discharge chamber 356 to the outlet 358.

With this form of construction the air will be exhausted at a very rapid rate due to the action of the two jets, yet will not by-pass too great a quantity of liquid after the discharge valve has been opened.

Figure 15:
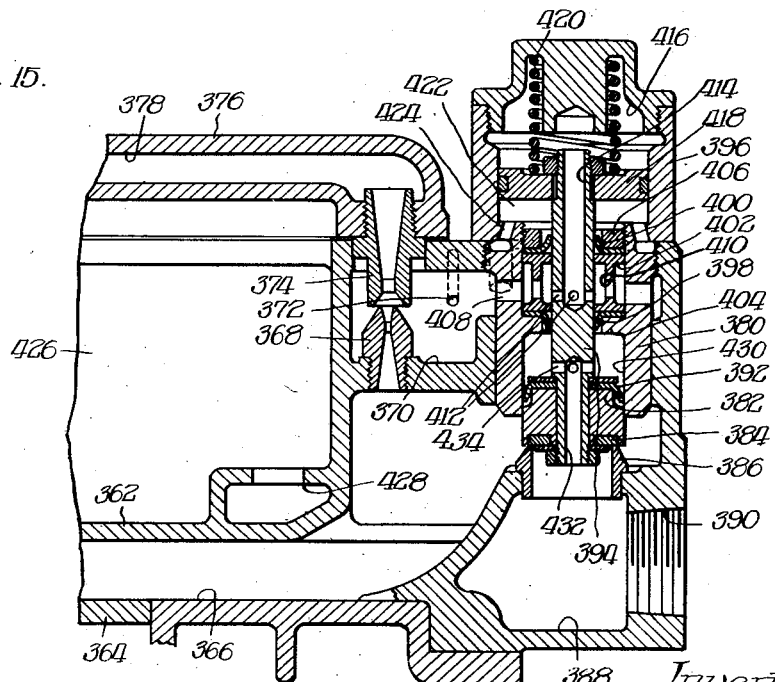
Figure 15 is an enlarged sectional elevation corresponding to Figure 6, showing a modified form of piston and discharge valve control.
Figure 26:
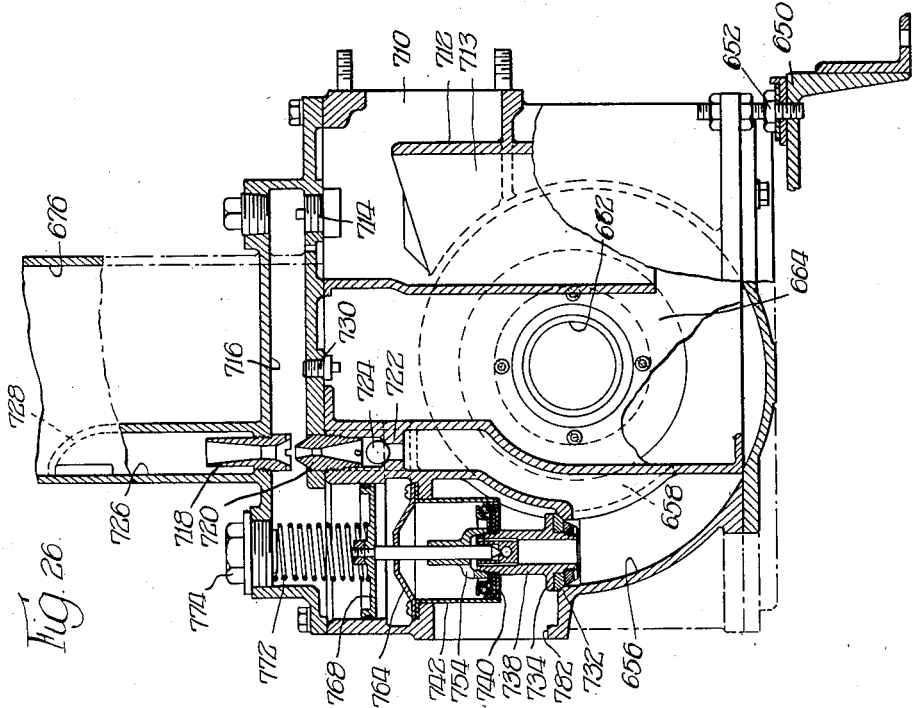
Figure 26 is a transverse sectional elevation of the pump illustrated in Figure 24, the same being taken through the outlet check valve, the suction and eddy chambers, and the inlet.
Figure 25:
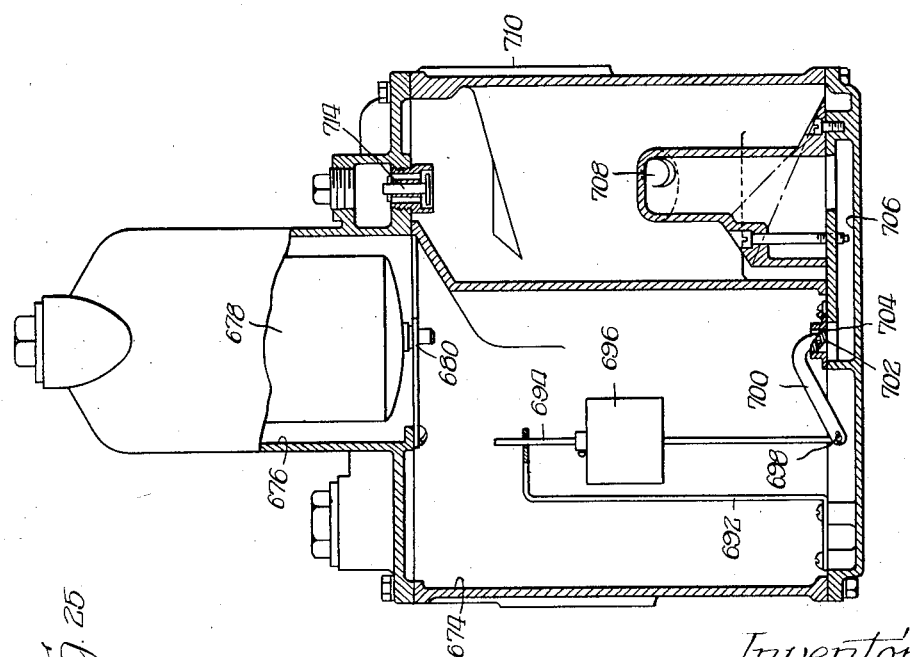
Figure 25 is a transverse sectional elevation of the pump illustrated in Figure 24, the same being taken through the float and eddy chambers.

In the construction illustrated in Figure 15, the pump casing 362 is provided with the bottom cover plate 364 forming the impeller chamber 366 for the impeller (not shown). The impeller chamber 366 communicates with the jet 368 provided in the jet chamber 370, said jet chamber being connected to the suction chamber through the orifice 372, corresponding to the orifice 218. The jet 368 is in alignment with the ejector tube 374 secured in the upper cover plate 376 and communicating with the ejector line 378. The casing is provided with the cylinder 380 secured thereto, a piston 382 being slidably mounted therein and provided with the discharge valve 384 adapted to seat on the valve seat 386 communicating with the discharge chamber 388, which in turn communicates with the discharge opening 390.

The piston 382 may be provided with suitable leathers 392 preventing leakage and said piston is secured to the valve stem or piston rod 394 extending upwardly into the housing 396. A suitable seal is provided as by the leathers 398 and 400, said leathers being secured by the fitting 402 interposed between the shoulder 404 of the cylinder and the securing nut 406 threaded into said cylinder. Suitable apertures 408 and 410 are provided in the cylinder walls and member 402 for permitting communication between the jet chamber and the openings 412 provided in the upper portion of the valve stem. The openings 412 communicate with the channel 414 which extends upwardly and opens into a chamber 416 provided in the housing 396. A piston 418 is secured to the piston rod adjacent the upper end thereof, being urged downwardly by means of the spring 420 disposed between the housing 396 and the piston 418. The piston is so disposed that when the valve 398 is in closed position, a chamber 422 is provided between the bottom of the piston 418 and the nut 406, and an opening 424 provides communication between the chamber 422 and the pump suction chamber as shown at 148 in Figure 9.

Figure 6:
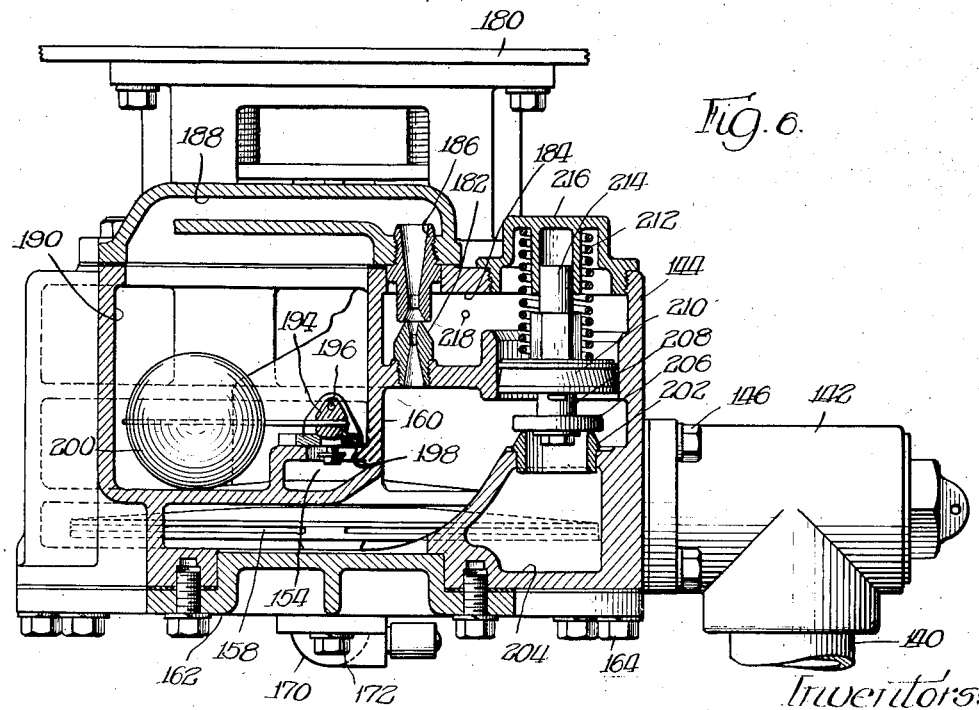
Figure 6 is an enlarged sectional elevation taken substantially in the plane as indicated by the line 6—6 of Figure 5.
Figure 7:
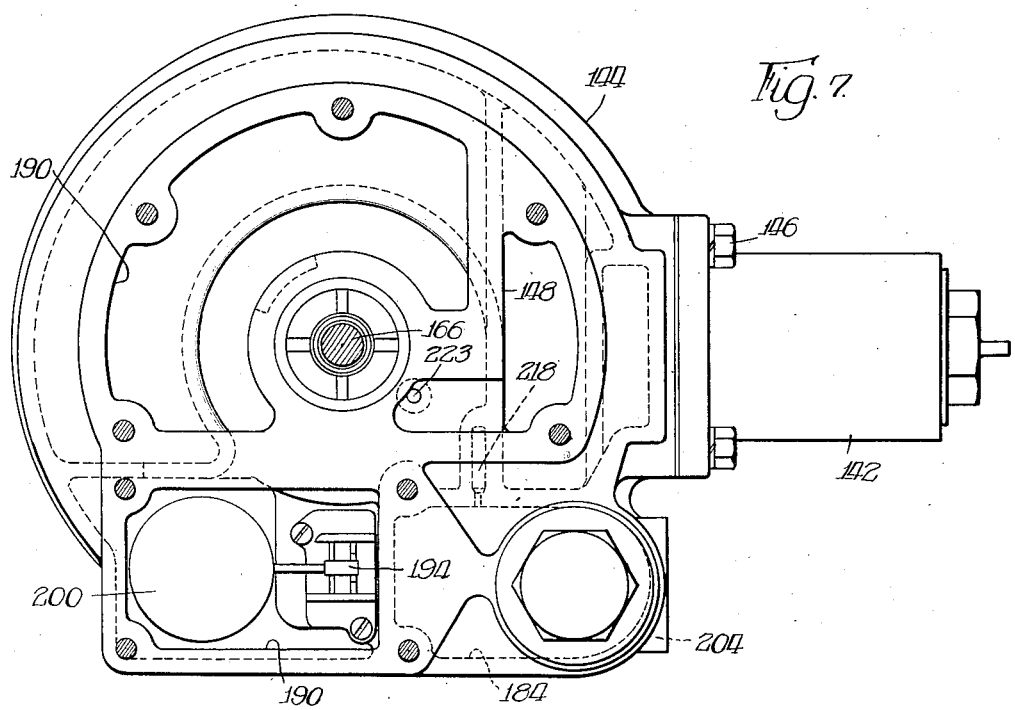
Figure 7 is an enlarged top plan view, partly in section, of the device illustrated in Figure 4, the section being taken substantially in the plane as indicated by the line 7—7 of Figure 8.
Figure 8:
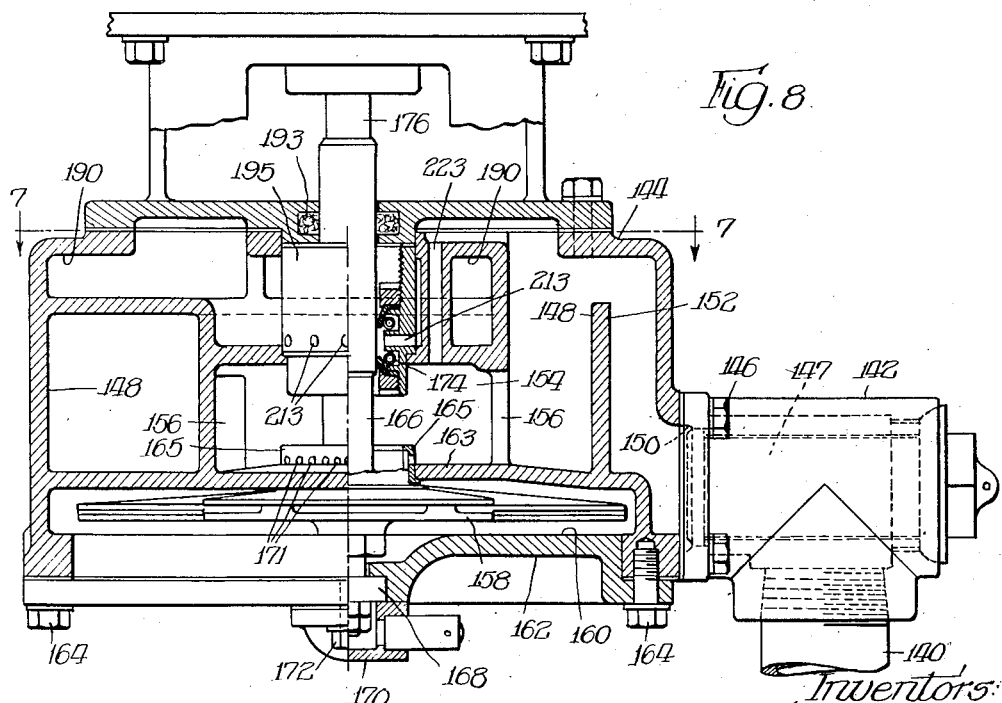
Figure 8 is an enlarged side elevation, partly in section, of the device illustrated in Figure 4, the section being taken substantially in the plane as indicated by the line 8—8 of Figure 5.

In operation of this form of the device, assuming the valve 384 to be closed, the operation of the impeller causes the liquid to pass upwardly through the jet 368, the ejector tube 374, and the ejector line 378, to the float chamber 426. A suitable float as shown in Figure 6 or 14 may be used controlling the opening 428, similar to the openings 198 or 324, which is in communication with the eddy chamber. The suction created by the passage of liquid through the jet and ejector tube causes a suction through the openings 408, 412 and channel 414 to the top of piston 418. Suction is also set up through the opening 424 between the bottom side of the piston 418 and the suction chamber. The ejector vacuum or suction on top of the piston 418 is greater than the pump suction in the chamber 422 and after the air has been exhausted and suction occurs through the orifice 372 by passage of clear liquid, the piston 418 will move upwardly against the spring 420, thus opening the valve 384. Additional suction may be induced in the chamber 430 to keep the valve open, after the valve is opened, as the valve is provided with the channel 432 communicating with the chamber 430 through the apertures 434 and with the discharge chamber 388, the channel 432 and the apertures 434 forming means for equalizing the pressures on the top and bottom of the valve, thereby making it sensitive in operation so that it will open and close properly at all times. Should air be introduced into the pump or should the pressure be decreased too greatly, the spring 420 will cause downward movement of the piston 418, as the ejector vacuum above the piston 418 will be reduced, as will the vacuum in the chamber 430, to cause closing of the valve 384.

In large installations such as those used in bulk station work where large driving means must be provided, it may be desirable to use the horizontal type of pump such as shown in Figures 16 to 20 inclusive. Where this type of pump is used the pump casing 436 is provided with the supporting members 438 and a horizontal drive shaft 440 adapted to be connected to a suitable driving means extends through spaced stuffing boxes 442 and 444 in the end closure members 446 and 448, the latter being secured to the casing by suitable fastening means 450.

Lubricating means 452 and 454 may be provided for supplying lubricant to the spaced antifriction bearings 456 and 458. The drive or impeller shaft 440 projects through the float chamber 460, the suction chamber 462 and the impeller chamber 464. The chambers 460 and 462 are separated by a suitable stuffing box 466. The impeller 468 is keyed or otherwise secured to the shaft 440 as at 470, and a collar 472 is secured as at 474 adjacent to the casing, adjacent said impeller, said collar projecting into the suction chamber 462 and being provided with the internal flange 476 overlying the edge of the impeller. The web 478 of said collar is apertured as at 480.

In Figure 22 the impeller shaft 440 is provided with the conventional impeller 482 disposed in the impeller chamber 464, the inlet edge extending toward the suction chamber 462. With this type of impeller it is found that if the clearance as at 483 is too great, a portion of the liquid expelled from the impeller, as shown by the arrows in Figure 22, will pass inwardly to the space 484 between the impeller and the wall 486, separating the suction and impeller chambers and will pass between the impelled and said walls and will re-enter the impeller as shown on the dotted lines 488. The effect of the wall of liquid so formed will be to create a chamber in which any air or vapor present in the liquid will accumulate until the pump will cease to function, that is, the pump will become air bound.

With the construction shown in Figures 16 and 21, however, a portion of the liquid flowing into the space 484 will pass between the collar and the impeller, but will be forced outwardly through the apertures 430 substantially perpendicular to the axis of the shaft 440 instead of parallel thereto as shown in Figure 22, and thus no wall of liquid, such as shown at 488, will be formed, and consequently the pump is less likely to become air bound.

The casing is provided with the inlet 490, adapted to be connected to any suitable source of supply, the inlet being in communication with the eddy chamber 492 through the opening 494, the inlet and opening 494 being so arranged that liquid will spiral downwardly, leaving the eddy chamber at 496 to enter the suction chamber 462. The eddy chamber 492 is also connected with the suction chamber through the ports 498, 500 and 502. The suction chamber 462 is also in communication with the jet chamber 504, through the orifice 506 and with the float chamber 460, through the port 508. The port 508 is controlled by the throttle valve 510 as already described, said valve being pivoted at 512 and loosely and pivotally connected to the bell crank 514. Said bell crank 514 is pivoted as at 516 to the support 518, and the longer arm of the bell crank is pivotally connected as at 520 to the stem 522 of the float 524, the upper end of said stem being preferably guided by means of the guide member 526 secured in the casing.

A slidable disc member 528 may be provided below the aperture 508 to prevent flooding of the system in the event the discharge nozzle is closed, the force of the incoming liquid under such conditions serving to raise the disc 528 until it closes the aperture 508. The float chamber is connected through the pipe 530 with the vent chamber 532, in which float 534 is provided, having a valve 536 controlling the opening in the valve seat 538 to the vent pipe 540, which permits the escape of the separated air or vapor.

The impeller chamber 464 communicates with the jet 542 which is in alignment with the ejector tube 544, the ejector tube and jet being spaced apart in the jet chamber, the ejector tube being in communication with the float chamber 460 through the ejector line 546. The jet chamber is in communication with the passage 548 through the opening 550, which in turn communicates with the pilot piston chamber 552, in which the pilot piston 554 is slidably mounted, though in the construction shown in Figure 20 this piston may be termed a main piston. The piston 554 is normally urged downwardly by means of spring 556 seated at its upper end on the removable fitting 558, and at its lower end on the piston 554. The piston 554 is provided with the valve stem 560 passing through suitable packing as at 562 provided in the retainer member 564 secured as at 565 in the pump casing.

The valve rod 560 is provided with the piston 566 having flanged leather 568 provided thereon backed by means of the coil spring 570 retained by the retainer plate 572, the piston member so formed being slidably mounted within the cylinder 574 of the fitting 564, whereby an equalizing chamber 576 is provided. The valve member 578 is provided with the resilient disc 580 adapted to fit on the valve seat 582 leading to the discharge chamber 584, which in turn communicates with the discharge 586 adapted to be connected to suitable discharge means as through a meter. The valve member 578 is connected to the piston 566 whereby a differential or balanced valve is provided. The valve 578 is mounted on the sleeve 588 and functions as a single unit with the piston 566, being fastened thereto as at 590. The sleeve 592 on which the member 588 is mounted fits loosely on the stem 560 and is retained thereon as by the nut 594 in such a manner that the valve 578 has freedom of movement within certain limits. This allows the disc 580 to form a perfect seal on the seat 582 regardless of any slight misalignment of parts.

The valve stem 560 is provided with the channel 596 extending upwardly and communicating with the cross holes 598 which communicate with the equalizing chamber 576, whereby said chamber is in communication with the discharge chamber 584. It will thus be seen that there are substantially the same pressures in the equalizing chamber as in the discharge chamber, and substantially the same pressures on the underside of the piston 566 as on the top of the valve 578. While the pump is being primed and until liquid has filled the suction chamber 462, and until it reaches the orifice 506, there is not sufficient pressure difference between the suction chamber and the chamber 552 to overcome the action of the spring 556, and consequently valve 578 remains closed. The action of the rotor 468 causes the liquid to flow through the jet 542 and the ejector tube 544, drawing the air or vapor through the jet chamber and from the eddy chamber. The air or vapor will pass upwardly through the pipe 530, vent chamber 532 and be discharged through the vent pipe 540. Liquid will be supplied to the float chamber, and when sufficient liquid is obtained in the float chamber, the float 524 will move upwardly, opening the valve 510, supplying the liquid to the suction chamber 462.

As soon as solid liquid is being pumped through the jet and ejector tube, a drop in pressure in the chamber 552 will occur, causing a pressure differential between the chamber 552 and the suction chamber 462, thus causing upward movement of the piston 554 against the spring 556. Upward movement of the piston 554 will raise the valve 578 to permit outward flow of liquid through the discharge chamber 584. The passage of liquid outwardly will also tend to reduce the pressure in the equalizing chamber 576, thus aiding in maintaining the valve in open position. Should an excess of air be introduced, the pressure differential will decrease, causing the spring 556 to close the valve 578 until sufficient air has been exhausted to again permit opening of the valve 578.

A different form of control valve is provided in the construction illustrated in Figure 23. In this construction the port 550 communicates with the chamber 552, in which the spring 556 is provided, seated as before at its upper end on the fitting 558. At the lower end of the spring it seats on the pilot piston 554, slidably mounted, said piston being provided with the piston rod 600 which extends through the stuffing box or other suitable packing 602 in the fitting 604 secured as at 606 in the housing, said fitting forming the cylinder 608 in which the piston 610 is slidably mounted, thus forming a cylinder chamber 612 above said piston. The piston 610 is provided with the stem 614, having the valve 616 thereon, said valve being provided with the resilient disc 618 seated on the valve seat 582. The piston 610 and the valve 616 are secured together by means of the tubular stem 620 as at 622, said tubular stem loosely fitting the extension 624 of the rod 600. The extension 624 is channeled as at 626 and is provided adjacent the upper end of said channel with the cross apertures 628. The rod 600 is provided with the valve member 630 above said aperture 628 seating on the valve seat 632 formed adjacent the top of the member 620.

When the pump is being primed, or until air has been eliminated, the spring 556 will cause the valve 616 to be closed. When solid liquid is being pumped through the jet the pressure differential between the suction chamber 462 against the pilot piston 554 and the impeller chamber 464 through the aperture 634 working against that portion of the stem 600 which is outside the valve seat at 632, which will permit the piston 554 to move upwardly against the spring 556 thus raising the valve 630 and the aperture 628 above the seat 632. The piston 610 is apertured as at 634 forming a connection between the impeller chamber 464 and the equalizing chamber 612. Thus when the piston rod 600 is moved upwardly by the piston 554, liquid in chamber 612 is allowed to pass through apertures 628 and 626, reducing the pressure in chamber 612 to a point where pressure on the lower side of piston 610 lifts the valve from the seat 582. Upon the recession of the piston 564, allowing stem 600 to close seat 632, liquid from chamber 464 passes through the aperture 634 into the chamber 612. The pressure from chamber 464 coming on top of chamber 616 closes the valve. The action in opening and closing the valve is substantially entirely hydraulic and operated by means of the difference in flow of liquid through the aperture controlled by the position of the stem 600 in relation to the valve seat 632. Of course introduction of air into the pump will cause the spring 556 to close the valve 630, which in turn will cause the valve 616 to be closed which will remain closed until air and vapor have been eliminated, as has already been described.

In the form of pump construction illustrated in Figures 24 to 28 inclusive, the operating means such as the motor 636 is provided with the drive shaft 638, said drive shaft extending into the pump casing 640, through the suitable rotary seal or stuffing box 642 provided in one end plate 644 of the casing, the end plate being secured thereto as at 646. The motor may be secured as at 648 to a suitable support 650, and the pump casing may be secured thereto as at 652 in order to form a rigid construction, and the motor and pump may further be secured together as at 654.

The drive shaft 638 extends into the impeller chamber 656 and has the impeller or rotor 658 secured thereto as at 660. The impeller is provided with the inlet flange 662 forming an opening at the center of the impeller to the suction 664. The impeller collar 666 is suitably secured to the wall 668 between the suction and impeller chambers and is provided with the inwardly directed flange 670, slightly overlapping the flange 662 of the impeller, and said impeller collar may be provided with the radial apertures such as described in Figures 18 and 21 for releasing any retained liquid or vapor or such to the suction chamber. As shown in Figure 28, said impeller collar may be directly connected through the tube or bore 672 to the float or vent chambers 674 or 676, whereby the air trapped within said collar, which has been separated, may be released directly to the float or vent chambers.

The float chamber 674 communicates with the vent chamber 676 in which a float 678 is provided, slidably guided by the members 680 and 682, the upper end of said float being provided with the vent valve 684 controlling the opening 688, leading to the vent 690 which may be connected to a suitable vent tube. The float chamber is provided with the guide 692 suitably secured therein and having a cooperative engagement with the float rod 694 of the float 696, the lower end of said float rod being pivotally connected as at 698 to the lever 700 provided on the pivoted valve 702. The valve 702 controls the outlet 704 to the passage 706 leading to the suction chamber 664, and in the event any air or vapor is left in the liquid passing through the opening 704, it will return to the eddy chamber through the opening 708. The pump casing is provided with the inlet 710 adapted to be secured to any suitable source of supply, liquid entering the opening passing over the baffle 712 into the eddy chamber 713 and to the suction chamber 664.

Adjacent the top of the suction chamber there is provided a valve 714 interposed between the ejector chamber 716 and the eddy chamber 713 to prevent liquid from being pulled out of the pump, that is, this valve is a vacuum breaker which prevents the liquid from being driven out of the impeller chamber back to the source of supply when the pump is rendered inoperative, as by stopping the motor, which would be done by the air passing through the ejector tube 718 and the aligned jet 720.

The impeller chamber 656 is provided with the valve seat 722 on which the ball valve 724 is adapted to seat. Liquid passing through the opening in the seat 722 will pass through the jet 720 and through the ejector tube 718 into a passage 726 where it is given a swirling or rotating motion by the wall 728, releasing the air inwardly of the vent chamber 676 where it is exhausted through the valve opening 688, and the separated liquid will pass downwardly from the vent chamber into the float chamber 674.

Between the ejector chamber 716 and the suction chamber there is provided a check valve 730 which is closed against the ejector chamber, this valve preventing surge of air or fluid from the ejector chamber into the suction chamber rather than taking the air or vapor through the ejector tubes 718. The impeller chamber 656 is provided with a valve opening defined by a valve seat 732 on which the valve 734 is adapted to be seated. Said valve consists essentially of the valve disc 736 of resilient or other material to insure proper seating of the valve, and a hollow valve stem 738 extending upwardly, and is suitably connected to a piston 740 slidably mounted in the cylinder 742.

The piston 740 may be provided with the flanged leathers 744 backed by means of springs 746 and retained by suitable retainer plate 748. The piston is secured by means of the fitting 750 threaded or otherwise secured as at 752 to the valve stem 738 and provided with radial openings 754. The fitting 750 is provided with a tubular portion which is adapted to loosely receive the piston plunger 756 extending downwardly therein and provided with the valve 758 adapted to be seated on the valve seat 760, defining a suitable opening communicating with the transverse through apertures 762 provided in the valve stem 738.

The piston rod 756 extends upwardly through a comparatively close fitting opening in the closure plate 764 secured in the casing at 766, the upper end of said rod being suitably secured to the pilot piston 768 slidably mounted in the pilot piston chamber 770. The piston 768 forms the lower seat of the spring 772, the upper seat for said spring being fitting 774. The pilot piston chamber is in communication with the jet chamber 716, and the space 776 between the pilot piston 768 and the cover plate 764 is in communication with the suction chamber 664.

When the motor 636 is started, rotation of the drive shaft 638 rotates the impeller 658, causing liquid disposed in the pump casing to be forced upwardly against the valve 734, but said valve will remain closed so long as there is any air or vapor entrained in the liquid. The liquid and vapor will flow upwardly past the valve 724 and through the jet 720 and the ejector tube 718, drawing some air and vapor from the jet chamber 716. As explained above, the liquid will be given a swirling motion in the vent chamber 676 by the wall 728 releasing the entrained air and vapor which will be exhausted through the vent 690. The liquid will flow downwardly through the float chamber 674, and after a suitable liquid level has been reached, the float 696 will open the valve 702, permitting the liquid to return to the suction chamber, any entrained air or vapor being released through the opening 708. This action will be repeated until all air and vapor is released, after which liquid will be drawn from the source of supply through the opening 710 past the baffle 712, through the eddy chamber 713, into the suction chamber 664, where it will be received by the impeller and forced outwardly of the impeller chamber 656. A portion of the liquid will flow upwardly through the channels 778 and into the plunger cylinder chamber 780 (Figure 27) of cylinder 742. As all the air is exhausted, the action of the jet and ejector tube will cause a differential in pressure between the pilot piston cylinder 770 and the chamber 776, causing the pilot piston 768 to move upwardly against the spring 772, whereby the valve 758 will be raised, permitting flow of liquid from the plunger chamber 780 formed in cylinder 742 to the discharge 782.

The pressure above the piston 744 being decreased, the valve 734 will be lifted and permit liquid to flow past the seat 732 to the discharge opening 782 where it can pass through a suitable meter and be measured and thence dispensed. Should any air or vapor be admitted into the inlet side of a pump, the pressure differential will decrease, permitting the spring 772 to close the valve 758, and consequently cause the valve 734 to be closed until the vapor has been entirely released from said pump.

In order to eliminate air trapped in the space 784, between the impeller 658 and the wall 786 of the pump casing, a communication chamber 788 is provided in said casing which is vented through the vent 790 to the upper portion of the suction chamber. In Figure 28 the channel 790 has been eliminated and a connection 792 has been made between the chamber 788 and the upper portion of the float chamber, this being preferable, inasmuch as the air has already been separated and it is better to release it directly rather than attempt to re-circulate it and eliminate it by the jet and ejector tube.

Referring now to the construction illustrated in Figures 29 and 30, a horizontal type of pump is shown having a casing 792, a drive shaft 794 similar to the drive shaft 638, inlet connection 796, outlet connection 798, impeller chamber 800, and the valve seat 802 between the outlet and the impeller chamber being normally closed by means of the valve 804. The impeller chamber 800 communicates with the jet 806 axially aligned with the ejector tube 808 in communication with the jet chamber 810. The ejector tube 808 is normally closed by the valve 812 and said ejector tube communicates with the passage 814 which communicates with the float chamber 816.

As before, there is an eddy chamber 818 communicating with a suction chamber which communicates with the center of the impeller, it being understood that the chambers and impeller arrangement are substantially the same as that shown and described in Figures 16 to 18 inclusive, the impeller chamber 800 communicating below the valve 804 in a similar manner to that of the impeller chamber 656, communicating below the valve 734 in the construction shown and described in Figures 24 to 28 inclusive. The valve 804 may be provided with the resilient disc 820 adapted to have seating engagement with the seat 802, said valve being provided with the outer valve stem 822 and being secured to the inner valve stem 824 as at 826. The valve stems 822 and 824 are connected to the piston 828 which may be provided with the flanged piston leathers 830 backed by means of the springs 832 retained by the retainer plates 834, the piston 828 being slidably mounted in the cylinder 836.

The member 824 extends through suitable packing 838 provided in the retainer 840, the latter being secured as at 842 in the pump casing. The member 824 is provided with a central channel 844 extending upwardly and being provided with the transverse apertures 846, communicating with the chamber 848 between the piston and the member 840; thus the pressure in the chamber 848 is equal to that of the impeller chamber 800. The upper end of the member 824 is provided with a valve seat 850, adapted to accommodate the valve 852 provided on the pilot piston 854. The pilot piston 854 is slidably mounted to the cylinder 856 and urged downwardly by means of a coil spring 858, the lower end of which seats on the piston and the upper end of which seats on the fitting 860. The pilot piston chamber 862 communicates with the jet chamber 546 through the aperture 550, and the jet chamber in turn communicates through the aperture 506 with the suction chamber 462.

It will thus be seen that when the valve is closed liquid is forced upwardly through the impeller chamber 800 where it passes through the channel 844 into the chamber 848, and as the area of the piston 828 is greater than the area of the lower end of the valve 804, the valve will remain closed. The liquid will pass upwardly through the jet and ejector tube and release the air and vapor in a manner already described through the vent chamber (not shown in Figures 29 and 30). When the air and vapor are eliminated, a pressure differential occurs between the pilot piston chamber 862, and the suction chamber 462, causing the piston 854 to move upwardly against the spring 858. Movement of the piston in an upward direction causes the valve 852 to become unseated, whereupon the liquid will pass upwardly through the channel 844 to the suction chamber, relieving the pressure in the chamber 848, causing a pressure differential in said chamber and in the impeller chamber below the valve 804. The valve 804 will, therefore, open, permitting the liquid to pass outwardly through the discharge chamber 864 to the outlet 798 where it may pass through a suitable meter and outwardly through suitable discharge means.

It is to be understood that we do not wish to be limited by the exact embodiment of the device shown, which are merely by way of illustration and not limitation, as various and other forms of the device will of course be apparent to those skilled in the art without departing from the spirit of the invention or the scope of the claims.

What is claimed is—

1. In a device of the character described, the combination of a casing, said casing having an impeller chamber adjacent the base thereof, an eddy chamber above said impeller chamber, a horizontally disposed impeller disposed to rotate in said impeller chamber and in communication with said eddy chamber, a float chamber in said casing vented to the atmosphere for releasing air separated in said float chamber, said float chamber having a return connection to said eddy chamber, a float controlled valve mounted in said float chamber for controlling said return connection, a suction chamber connected to said eddy chamber and having a supply opening, a baffle in said chamber for maintaining the liquid level in a portion of said casing at a predetermined height, a jet chamber disposed adjacent said impeller chamber and connected thereto by a jet, a discharge chamber having a discharge opening, a differential valve for controlling flow from said impeller to said discharge chamber, one side of said valve being in communication with said jet chamber, an ejector line connected to said float chamber and to said jet chamber through an ejector tube disposed adjacent and in substantial alignment with said jet, a connection between said jet chamber and said suction chamber above said baffle, a vertically disposed drive shaft connected to said impeller and extending upwardly for connection to driving means, said drive shaft extending through said eddy chamber and said float chamber, a stuffing box having cooperative relation with said shaft and interposed between said eddy and float chambers and in communication with said float chamber, said stuffing box being so constructed and arranged that suction in said eddy chamber will increase the tightness between said stuffing box and said shaft, and stuffing box means interposed between said float chamber and said casing.

2. In a device of the character described, the combination of a casing, said casing having an impeller chamber, an eddy chamber in communication with said impeller chamber, an impeller disposed to rotate in said impeller chamber and in communication with said eddy chamber, a float chamber in said casing vented to the atmosphere for releasing air separated in said float chamber, said float chamber having a return connection to said eddy chamber, a float controlled valve mounted in said float chamber for controlling said return connection, a suction chamber connected to said eddy chamber and having a supply opening, said suction chamber being so constructed and arranged that the liquid level in a portion of said casing is at not less than a predetermined height, a jet chamber disposed adjacent said impeller chamber and connected thereto by a jet, a discharge chamber having a discharge opening, a differential valve for controlling flow from said impeller to said discharge chamber, one side of said valve being in communication with said jet chamber, an ejector line connected to said float chamber and to said jet chamber through an ejector tube disposed adjacent and in substantial alignment with said jet, a connection between said jet chamber and said suction chamber above said liquid level, a drive shaft connected to said impeller and extending through said eddy chamber and float chamber, a stuffing box having cooperative relation with said shaft and interposed between said eddy and float chambers and in communication with said float chamber, said stuffing box being so constructed and arranged that suction in said eddy chamber will increase the tightness between said stuffing box and said shaft, and stuffing box means interposed between said float chamber and said casing.

3. In a device of the character described, the combination of a casing, said casing having an impeller chamber, an eddy chamber communicating with said impeller chamber, an impeller disposed to rotate in said impeller chamber and in communication with said eddy chamber, a drive shaft connected to said impeller and adapted to be connected to driving means, a float chamber in said casing vented to the atmosphere for releasing air separated in said float chamber, said float chamber having a return connection to said eddy chamber, a float controlled valve mounted in said float chamber for controlling said return connection, a suction chamber connected to said eddy chamber and having a supply opening, said chamber being so constructed and arranged as to maintain the liquid level in a portion of said casing at a predetermined height, a jet chamber, a discharge chamber having a discharge opening, a normally closed differential valve for controlling flow from said impeller to said discharge chamber, one side of said valve being in communication with said jet chamber, an ejector line connecting said float chamber to said jet chamber, ejecting means operable by liquid from the impeller chamber for forcing fluid from the jet chamber into the ejector line, a connection between said jet chamber and said suction chamber, said differential valve being provided with an ejector connecting said impeller chamber and said jet chamber, and a connection between said float chamber and said ejector for conducting fluid to said float chamber, said ejecting means and said ejector operating in parallel, movement of said differential valve toward open position controlling the action of said ejector.

4. In a device of the character described, the combination of a pump the inlet side of which is adapted to be connected to a source of liquid supply and having an outlet, an air separator connected to the inlet side of said pump, a connection between said air separator and the outlet side of said pump, said last named connection having an ejector operating toward said air separator and supplied continually with liquid from said pump, a connection between said ejector and said pump on the inlet side thereof, whereby liquid passing through said ejector to saiu air separator removes the air from said pump, a normally closed valve for controlling the outlet of said pump, said valve being subjected to suction from said ejector for opening said valve, said valve being operable after said pump has built up a predetermined delivery pressure to permit supply of liquid through the outlet, and means for throttling one of the connections to said air separator while said predetermined pressure is maintained.

5. In a device of the character described, the combination of a casing, said casing having an impeller chamber, an eddy chamber communicating with said impeller chamber, an impeller disposed to rotate in said impeller chamber and in communication with said eddy chamber, a drive shaft connected to said impeller, one end of said shaft extending outwardly of said casing, a float chamber in said casing vented to the atmosphere for releasing air separated in said float chamber, said float chamber having a return connection to said eddy chamber, a float controlled valve mounted in said float chamber for controlling said return connection, a suction chamber connected to said eddy chamber and having a supply opening, said chamber being so constructed and arranged as to maintain the liquid level in a portion of said casing at a predetermined height, a jet chamber disposed adjacent said impeller chamber, a discharge opening for the impeller chamber, a valve controlling said discharge opening, said valve having differential areas exposed to pressure in said impeller chamber for tending to open the valve, means tending to maintain said valve in closed position, said valve having a surface subject to the vacuum in said jet chamber for aiding in opening said valve, an ejector line connected to said float chamber and to said jet chamber, ejecting means disposed in the path of discharge of liquid from the impeller and supplied with liquid from the impeller chamber for forcing liquid from the jet chamber into the ejector line, and a connection between said jet chamber and said suction chamber.

6. In a device of the character described, the combination of a casing, said casing having an impeller chamber, an eddy chamber communicating with said impeller chamber, an impeller disposed to rotate in said impeller chamber and in communication with said eddy chamber, a drive shaft mounted adjacent one end on a thrust bearing and connected to said impeller, the other end of said shaft extending outwardly of said casing, a float chamber in said casing vented to the atmosphere for releasing air separated in said float chamber, said float chamber having a return connection to said eddy chamber, a float controlled valve mounted in said float chamber for controlling said return connection, a suction chamber connected to said eddy chamber and having a supply opening, said chamber being so constructed and arranged as to maintain the liquid level in a portion of said casing at a predetermined height, a jet chamber disposed adjacent said impeller chamber, a discharge opening for the impeller chamber, a valve controlling said discharge opening, said valve having differential areas exposed to pressure in said impeller chamber for tending to open the valve, means tending to maintain said valve in closed position, said valve having a surface subject to the vacuum in said jet chamber for aiding in opening said valve, an ejector line connected to said float chamber and to said jet chamber, ejecting means disposed in the path of discharge of liquid from the impeller and supplied with liquid from the impeller chamber for forcing fluid from the jet chamber into the ejector line, a connection between said jet chamber and said suction chamber, control means for said ejecting means, said control means being operatively connected to said jet chamber for regulating operation of said control means.

7. In a device of the character described, the combination of a casing, said casing having an impeller chamber, an eddy chamber communicating with said impeller chamber, an impeller disposed to rotate in said impeller chamber and in communication with said eddy chamber, a drive shaft mounted adjacent one end on a thrust bearing and connected to said impeller, the other end of said shaft extending outwardly of said casing, a float chamber in said casing vented to the atmosphere for releasing air separated in said float chamber, said float chamber having a return connection to said eddy chamber, a float controlled valve mounted in said float chamber for controlling said return connection, a suction chamber connected to said eddy chamber and having a supply opening, said chamber being so constructed and arranged as to maintain the liquid level in a portion of said casing at a predetermined height, a jet chamber disposed adjacent said impeller chamber, a connection between said jet chamber and said suction chamber, a discharge chamber adjacent said jet and impeller chambers and having a discharge opening, a normally closed differential valve for controlling flow from said impeller to said discharge chamber, one side of said valve being in communication with said jet chamber, an ejector line connected to said float chamber and to said jet chamber, ejecting means operable by liquid from the impeller chamber for forcing fluid from the jet chamber into the ejector line, ejecting means mounted in said differential valve connecting said impeller chamber, said ejector line and said jet chamber, and means mounted in said casing for controlling said ejecting means by the movement of said differential valve.

8. In a device of the character described, the combination of a casing, said casing having an impeller chamber adjacent the base thereof, an eddy chamber above said impeller chamber, a horizontally disposed impeller disposed to rotate in said impeller chamber and in communication with said eddy chamber, a float chamber in said casing vented to the atmosphere for releasing air separated in said float chamber, said float chamber having a return connection to said eddy chamber, a float controlled valve mounted in said float chamber for controlling said return connection, a suction chamber connected to said eddy chamber and having a supply opening, a baffle in said chamber for maintaining the liquid level in a position of said casing at a predetermined height, a jet chamber disposed adjacent said impeller chamber and connected thereto by a jet, a discharge chamber having a discharge opening, a normally closed differential valve for controlling flow from said impeller to said discharge chamber, one side of said valve being in communication with said jet chamber, an ejector line connected to said float chamber and to said jet chamber through an ejector tube disposed adjacent and in substantial alignment with said jet, a connection between said jet chamber and said suction chamber above said baffle, a vertically disposed drive shaft connected to said impeller and extending upwardly for connection to driving means, said drive shaft extending through said eddy chamber and said float chamber, said impeller having an inlet flanged portion extending into said eddy chamber, and an impeller collar overlapping said flanged portion and having apertures therein radial of said flange.

9. In a centrifugal pump, the combination of a pump casing having an impeller chamber and a float chamber, an impeller rotatably mounted therein, said casing having a jet chamber, a jet connecting said jet and impeller chambers, said casing having a discharge, a normally closed valve for controlling said discharge, a piston connected to said valve, one side of said piston being in communication with said impeller chamber and the other side of said piston being in communication with said jet chamber, a spring normally urging said piston to close said valve, said casing having an ejector line communicating with said float chamber, a communication between said float chamber and said impeller, an ejector tube aligned with said jet and extending into said ejector line, another ejector tube communicating with said ejector line, and a jet carried and controlled by said valve and communicating with said impeller chamber and so constructed and arranged that opening said valve throttles said last named jet and ejector tube.

10. In a centrifugal pump, the combination of a pump casing having an impeller chamber, an impeller rotatably mounted therein, said casing having a jet chamber, a jet connecting said jet and impeller chambers, said casing having a discharge, a normally closed valve for controlling said discharge, a pilot piston connected to said valve through a piston rod, and a spring normally urging said valve to closed position, the under side of said piston being in communication with said jet chamber, said piston rod being channeled and connecting the upper side of said piston with said jet chamber, said casing having a discharge chamber and a closed chamber above said valve, said piston rod being channeled to connect said last named chambers.

11. In a device of the character described, the combination of a casing, said casing having an impeller chamber adjacent the base thereof, an eddy chamber above said impeller chamber, a horizontally disposed impeller disposed to rotate in said impeller chamber and in communication with said eddy chamber, a vertically disposed drive shaft connected to said impeller and extending outwardly of said casing, a float chamber in said casing vented to the atmosphere for releasing air separated in said float chamber, said float chamber having a return connection to said eddy chamber, a float controlled valve mounted in said float chamber for controlling said return connection, a suction chamber connected to said eddy chamber and having a supply opening, a baffle in said chamber for maintaining the liquid level in a portion of said casing at a predetermined height, a jet chamber disposed adjacent said impeller chamber and connected thereto by a Venturi jet, a discharge chamber adjacent said jet and impeller chambers and having a discharge opening, a normally closed differential valve for controlling flow from said impeller to said discharge chamber, one side of said valve being in communication with said jet chamber, an ejector line connected to said float chamber and to said jet chamber through an ejector tube disposed adjacent and in substantial alignment with said jet, and a connection between said jet chamber jet, and a connection between said jet chamber and said suction chamber above said baffle.

12. In a device of the character described, the combination of a casing having an impeller chamber and a suction chamber, a rotary impeller disposed to rotate in said impeller chamber and having an inlet in communication with the suction chamber, said casing having an inlet communicating with said suction chamber and an outlet communicating with said impeller chamber, a valve for closing the outlet, means for closing said valve, an air separator having a connection to said suction chamber and effective to supply liquid from the separator to said suction chamber but to maintain a predetermined amount of liquid in said separator, air exhaust means from the separator, ejector means connecting the impeller chamber and said separator for supplying fluid to said separator, the inlet of said ejector means being disposed in the path of discharge from said impeller, the suction side of said ejector being operatively connected to said suction chamber and said valve so that said valve is opened ultimately by suction after a predetermined amount of air has been exhausted from the casing.

13. In an apparatus of the character described, the combination of a pump having an inlet and an outlet, a valve for controlling said outlet, an air separator connected to the inlet side of said pump, a constant connection between said air separator and the pump side of said valve, an ejector in said connection, the suction side of said ejector communicating with said valve whereby the suction of said ejector acting on the valve with the pressure developed by said pump serves to control said valve, and a connection between the suction side of said ejector and said inlet.

14. In a device of the character described, the combination of a casing, said casing having an impeller chamber, a suction chamber in communication with said impeller chamber and having a supply opening therein, an impeller disposed to rotate in said impeller chamber and in communication with said suction chamber, a float chamber in said casing vented externally of said casing for releasing air separated in said float chamber, said float chamber having a return connection to said suction chamber, a float controlled valve mounted in said float chamber for controlling said return connection, a jet chamber disposed adjacent said impeller chamber and connected thereto by a jet, a discharge chamber having a discharge opening, a valve between the impeller and discharge chambers for controlling flow from said impeller to said discharge chamber, said valve having a piston connected thereto and having one side of said piston in communication with said jet chamber and subject to the suction in said jet chamber for causing opening of said valve, an ejector line connected to said float chamber and to said jet chamber through an ejector tube disposed adjacent and in substantial alignment with said jet, a connection between said jet chamber and said suction chamber, a drive shaft connected to said impeller and extending through said suction chamber, and a stuffing box having cooperative relation with said shaft and carried by said casing.

15. In a device of the character described, the combination of a casing, said casing having an impeller chamber adjacent the base thereof, a suction chamber above said impeller chamber and having a supply opening therein so disposed that a predetermined liquid level is maintained in said casing, a horizontally disposed impeller disposed to rotate in said impeller chamber and in communication with said suction chamber, a vertically disposed driving shaft connected to said impeller and extending outwardly of said casing, a float chamber in said casing vented externally of said casing for releasing air separated in said float chamber, said float chamber having a return connection to said suction chamber, a float controlled valve mounted in said float chamber for controlling said return connection, a jet chamber disposed adjacent said impeller chamber and connected thereto by a Venturi jet, a discharge chamber adjacent said jet and impeller chambers and having a discharge opening, a normally closed valve between the impeller and discharge chambers for controlling flow from said impeller to said discharge chamber, said valve having a piston connected thereto and having one side of said piston in communication with said jet chamber and subject to the suction in said jet chamber for causing opening of said valve, an ejector line connected to said float chamber and said jet chamber through an ejector tube disposed adjacent and in substantial alignment with said jet, and a connection between said jet chamber and said suction chamber.

16. In a device of the character described, the combination of a casing, said casing having an impeller chamber, a suction chamber having a supply opening, an impeller disposed to rotate in said impeller chamber and in communication with said suction chamber, means for driving the impeller, a settling chamber in said casing and having a return to said suction chamber, means for controlling said return, venting means for said casing, a jet chamber, discharge means including an outlet, a valve controlling said outlet having differential areas exposed to the pressures in the impeller chamber for tending to open the valve, means tending to maintain the valve in closed position, said valve having a surface subject to the suction in said jet chamber for aiding in opening the valve, an ejector line connected to said settling chamber and to said jet chamber, ejecting means located in the path of discharge of liquid from the impeller and supplied with liquid from the impeller chamber for drawing fluid from the jet chamber into the ejector line, and a connection between said jet chamber and said suction chamber.

17. In a device of the character described, the combination of a casing, said casing having an impeller chamber, a suction chamber having a supply opening, an impeller disposed to rotate in said impeller chamber and in communication with said suction chamber, means for driving the impeller, a settling chamber in said casing having a return to said suction chamber, means for controlling said return, venting means for said casing, a jet chamber, discharge means including an outlet, a valve interposed between said impeller chamber and outlet controlling said outlet and having a piston connected thereto, said valve having means tending to maintain the valve in closed position, connecting means between said jet chamber and said piston whereby the suction created in said jet chamber acts on said piston to move said valve to open position, an ejector line connected to said settling chamber and to said jet chamber, ejecting means located in the path of discharge of liquid from the impeller and supplied with liquid from the impeller chamber for drawing fluid from the jet chamber into the ejector line, and a connection between said jet chamber and said suction chamber.

18. In a device of the character described, the combination of a casing, said casing having an impeller chamber, a suction chamber having a supply opening, an impeller disposed to rotate in said impeller chamber and in communication with said suction chamber, means for driving the impeller, a settling chamber in said casing and having an outlet connected to said suction chamber, means for controlling said outlet, venting means for said casing, a jet chamber, discharge means including an outlet, a valve controlling the outlet from said impeller chamber, means normally urging said valve to closed position, and means associated with said valve and responsive to the suction created in said jet chamber to open said valve, an ejector line connected to said settling chamber and to said jet chamber, ejecting means located in the path of discharge of liquid from the impeller and supplied with liquid from the impeller chamber for drawing fluid from the jet chamber into the ejector line, and a connection between said jet chamber and said suction chamber.

19. In a device of the character described, the combination of a casing having an impeller chamber, a suction chamber operatively connected to a source of liquid supply, an impeller in said impeller chamber and in communication with said suction chamber, means for driving the impeller, a settling chamber in said casing having an outlet connected to said suction chamber, means for controlling flow of liquid through said outlet, a jet chamber, discharge means including an outlet, a valve controlling the outlet from said impeller chamber, means normally urging said valve to closed position, and means associated with said valve and responsive to the suction created in said jet chamber to open said valve, an ejector line connected to said settling chamber and to said jet chamber, ejecting means disposed in the path of discharge of fluid from the impeller and operable by liquid from the impeller chamber for drawing fluid from the jet chamber into the ejector line, and means whereby suction is created in said suction chamber by said ejecting means.

20. In a device of the character described, the combination of a casing, said casing having an impeller chamber, a suction chamber having a supply opening, an impeller disposed to rotate in said impeller chamber and in communication with said suction chamber, means for driving the impeller, a settling chamber in said casing vented externally of the casing and having a return to said suction chamber, means in said settling chamber for controlling said return, a jet chamber, discharge means including an outlet, a valve controlling the outlet from said impeller chamber, means normally urging said valve to closed position, and means associated with said valve and responsive to the suction created in said jet chamber to open said valve, an ejector line connected to said settling chamber and to said jet chamber, ejecting means disposed to be in the path of discharge of liquid from the impeller and supplied with liquid from the impeller chamber for drawing fluid from the jet chamber into the ejector line, and a connection between said jet chamber and said suction chamber, and means for rendering said ejecting means substantially inoperative after said suction has opened said valve.

ROBERT J. JAUCH.
BYRON J. PEPPER.